United States Patent [19]

Nakase et al.

[11] Patent Number: 4,525,657
[45] Date of Patent: Jun. 25, 1985

[54] TORQUE RIPPLE COMPENSATION CIRCUIT FOR A BRUSHLESS D.C. MOTOR

[75] Inventors: Hiromi Nakase, Nara; Yasuhiro Gotoh, Kadoma; Kuniichi Ozawa, Hirakata, all of Japan

[73] Assignee: Matsushita Electric Industrial Co., Ltd., Kadoma, Japan

[21] Appl. No.: 587,252

[22] Filed: Mar. 7, 1984

[30] Foreign Application Priority Data

Mar. 9, 1983 [JP] Japan ................................. 58-39882
Nov. 30, 1983 [JP] Japan ............................... 58-225912
Nov. 30, 1983 [JP] Japan ............................... 58-225913

[51] Int. Cl.$^3$ ............................................ H02P 6/02
[52] U.S. Cl. .................................... 318/254; 318/313
[58] Field of Search .................. 318/138, 254 A, 254, 318/439, 313

[56] References Cited

U.S. PATENT DOCUMENTS 3,564,370 2/1971 Catherin .............................. 318/343
3,766,458 10/1973 Nishimura et al. ................. 318/313
4,024,446 5/1977 Burnett ........................... 318/313 X
4,223,261 9/1980 White .................................. 318/313

FOREIGN PATENT DOCUMENTS 52-43926   4/1977 Japan .................................. 318/254
55-109188  8/1980 Japan .................................. 318/254
55-117485  9/1980 Japan .................................. 318/254
56-71489   6/1981 Japan .................................. 318/254

Primary Examiner—William M. Shoop
Assistant Examiner—Bentsu Ro
Attorney, Agent, or Firm—Cushman, Darby & Cushman

[57] ABSTRACT

In an electronic commutated motor, ripple of driving torque is perfectly compensated into uniform torque by controlling stator current; therein mechanical 360° angle of rotation of the rotor magnet is divided into e.g. 12 partitioned ranges (of 30°), said compensation being made by repeatedly reading out the same compensation data for the 30° range by utilizing an address counter which is reset at each beginning of said partitioned ranges.

4 Claims, 22 Drawing Figures

FIG.1 (a) (Prior Art)
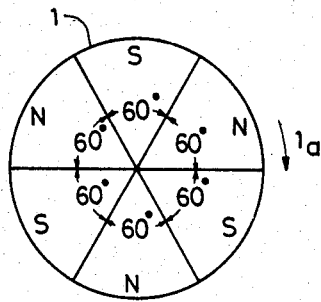
FIG.1 (b) (Prior Art)
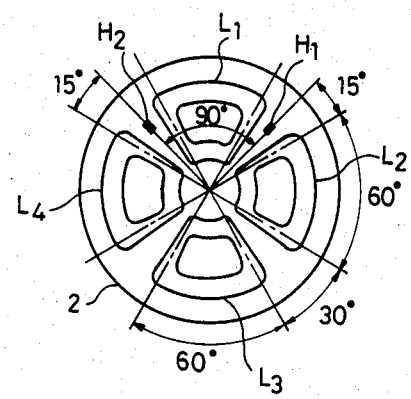

Rotation positon (Mechanical angle)

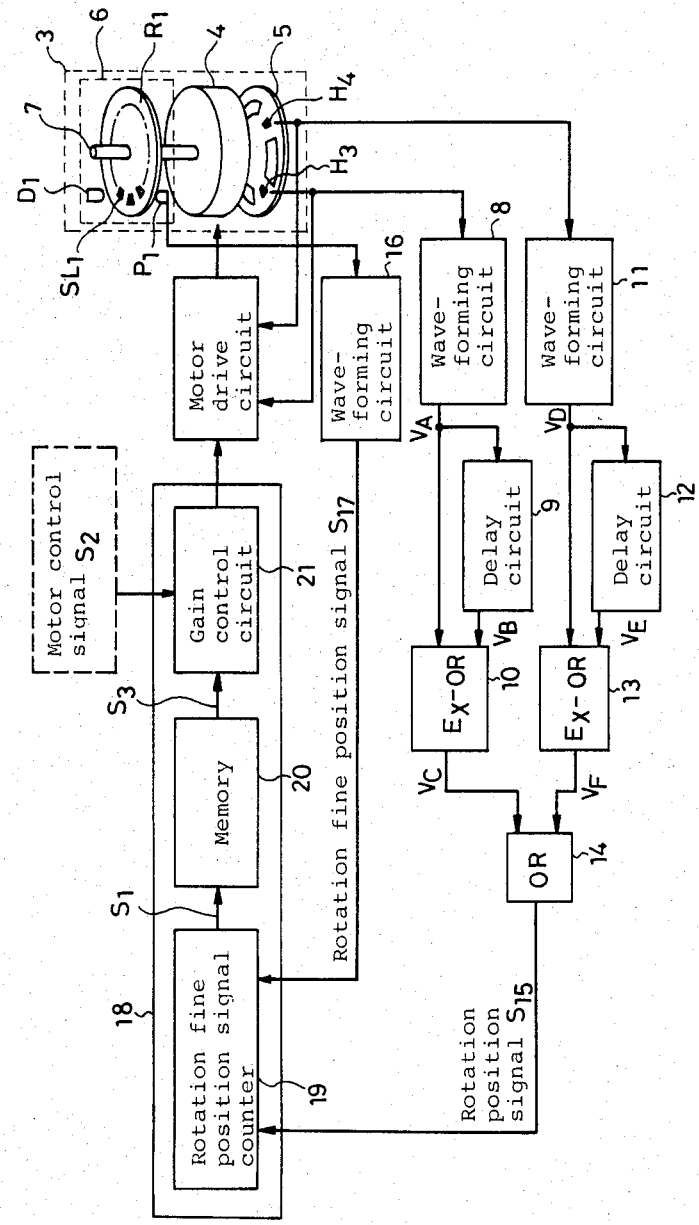
F I G. 6

Rotation position (Mechanical angle)

FIG. 21

| Reset time setting signal | | Rotation direction | |
|---|---|---|---|
| $B_1$ | $B_2$ | CW | CCW |
| H | H | 6 | 0 |
| L | H | 3 | 3 |
| L | L | 0 | 6 |

TORQUE RIPPLE COMPENSATION CIRCUIT FOR A BRUSHLESS D.C. MOTOR

BACKGROUND OF THE INVENTION

1. Field of the Technology

The present invention relates to a rotation control apparatus for an electric motor, especially an electronic commutator motor of very accurately smooth revolution.

In recent years, small type, high efficiency and reliable DC electronic commutator motors become widely used as rotary heads driving motor, capstan driving motor or reel driving motor of video-tape recorder (hereinafter is referred to as VTR) of inclined scanning tape type wherein recording and reproduction of video signal are made by rotary heads, by direct coupling of such electronic commutator motor to the rotary head cylinder, capstan shaft and reel shaft. In such VTR, since the video signal is recorded by the rotary heads driven at a very high speed by the rotary head driving motor on a magnetic recording media, if there are some non-uniformity of rotation takes place the time axis of the video signal fluctuates, and therefore the reproduced video image has horizontal vibration resulting in bad quality of picture. Accordingly, torque ripple of rotary head driving motor which becomes undesirable rotation fluctuation must be controlled in order to eliminate such undesirable deterioration of the picture.

Furthermore, the audio signal is generally recorded in the VTR by means of a fixed audio recording head which is disposed fixedly with respect to the running tape and to the rotating video head. Accordingly, when a capstan driving motor which drives the video tape makes a fluctuation of rotation speed, then the reproduced audio signal has undesirable distortions called wow and flutter induced by fluctuation of time axis of the audio recording. Accordingly, in the capstan driving motor, torque ripple which becomes the cause of the fluctuation of rotation must be controlled.

Furthermore, also in the reel driving motor, unless torque ripple produced thereby is suppressed, the video tape of running state is subject to fluctuation of tape tension, and thereby induces fluctuation of rotations of capstan driving motor and rotary head driving motor, resulting in the undesirable horizontal vibration of the reproduced picture, and wow and flutter of the reproduced audio signal.

As is elucidated above, in order to obtain stable and good reproduced signal of the VTR or the like apparatus, the suppressing of torque ripple of motor becomes very important item.

Hitherto, suppressing of the fluctuation of rotation induced by the torque fluctuation of the motor has been made by increasing moment of inertia of the rotating members and increase of gains of controlling circuit of the motor.

However, in portable type VTRs, in order to decrease weight and size, moment of inertia of the driving motors of the rotary heads and the capstan must be made small. Moreover, when direct-couple driving are adopted for such driving motors, the rotation speed of the motor becomes low, and therefore the hitherto-adopted way of relying on the increased moment of inertia and increased gain can not satisfactorily suppress the ripple of rotations of the related members.

SUMMARY OF THE INVENTION

The purpose of the present invention is to provide a rotation control apparatus for an electronic commutator motor improved for suppressing non-uniformity of rotation induced by fluctuation of torque of the motor.

The above-mentioned purpose of the present invention is achieved by constituting the rotation control apparatus for an electronic commutator motor:

the electronic commutator motor comprising a predetermined plural number of stator coils disposed with a predetermined mechanical angle around an axis of rotation of the electronic commutator motor, a rotor magnet which has a predetermined number of magnetic poles of N and S disposed alternately with predetermined mechanical angles and held in a rotatable manner around the axis, and a rotation position signal output means for issuing a rotation position signal responding to mechanical rotation of the rotor relative to the stator coils, and the rotation control apparatus comprises:

a rotation fine position signal output means for issuing a rotation fine position signal consisting of a predetermined number of pulses during one period of repetition of the rotation position signal in a synchronized relation with the rotation position signal, a fine position signal counter for producing an electric angle signal which is a signal responding to number of pulses of the rotation fine position signal counted from each time when a pulse of the rotation position signal is issued by receiving the rotation fine position signal, memory means which has preliminarily stored data for compensation function for compensating amount of stator current to compensate torque ripple, to produce uniform torque, gain control means for controlling intensities of the stator current responding to output of the memory means, to produce compensated uniform current in the stator coils.

By the above-mentioned constitution, the torque of the electric motor in accordance with the present invention is controlled so that its output torque is always constant irrespective of existence of particular pattern of the magnetic flux distribution of the rotor magnet by utilizing preliminarily recorded compensation function for compensation of the stator current.

Besides, the rotation control apparatus in accordance with the present invention can achieve the advantages that:

electronic commutator motors of small and light weight type can be made with very small wow and flutter characteristics even at a very small rotation speed;

a memory of rather small capacity and an encoder of a relatively small capacity can be used in this apparatus in comparison with the prior art apparatus; since mechanical 360° angle of the rotor magnet rotation is divided into a predetermined number of partitioned angle ranges, and the compensations with the data for one partitioned angle range are repeatedly carried out for every partitioned angle ranges, when signals for controlling a motor drive circuit is used in producing rotation position signal, number of detector elements can be reduced, even if there is some angular positional disagreement between the rotor magnet and components of angular detection means, such disagreement can be electrically adjusted, and the adjusting is made even when rotation direction is inversed.

BRIEF EXPLANATION OF THE DRAWING

FIG. 1(a) is a schematic plan view showing arrangement of rotor magnet.

FIG. 1(b) is the schematic plan view of the stator coils of the general electronic commutator motor.

FIG. 6 is a block diagram of a first embodiment of the present invention.

FIG. 21 is a diagram showing amounts of delays of the reset timing circuit.

DESCRIPTION OF THE PREFERRED EMBODIMENT

Figure 2:
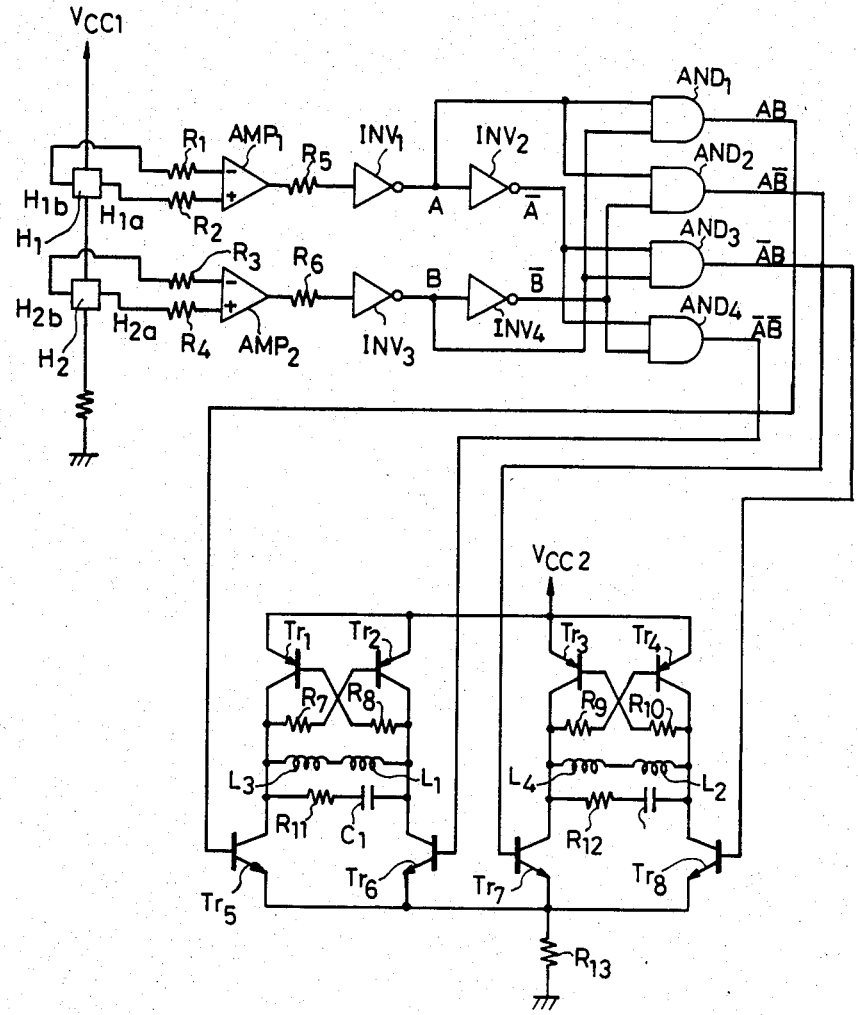
FIG. 2 is the circuit diagram of one example of driving circuit of the conventional electronic commutator motor of FIG. 1(a) and FIG. 1(b).

Firstly, general description is given on why ripple of torque is produced in the general electronic commutator motor. Such general elucidation is made on an electronic commutator motor with four stator coils and six magnetic poles on its rotor magnet, to be operated in two phase full wave driving, and the below-mentioned embodiments are described taking example of this type. But it should be noted of course that other electronic commutator motors having the stator coils and poles of rotor magnet in different numbers may be constituted in accordance with the present invention. FIG. 1(a) shows rotor magnet 1 of the electronic commutator motor embodying the present invention in a plan view, and FIG. 1(b) is a plan view of a printed circuit substrate 2 having stator coils provided thereon. As shown in FIG. 1(a), the rotor magnet 1 has three S poles and three N poles disposed alternately with 60° angles (mechanical angles) around its center axis. The stator substrate has four stator coils $L_1$, $L_2$, $L_3$ and $L_4$ disposed with 90° angles (mechanical angle) around its center axis, and each coil has their radial direction parts diverging with 60° angle inbetween. The printed circuit substrate 2 also has a first Hall element $H_1$ and a second Hall element $H_2$ which are disposed at a first intermediate position between the first coil $L_1$ and the second coil $L_2$, and at a second intermediate position between the fourth coil $L_4$ and the first coil $L_1$, respectively. FIG. 2 shows one preferred embodiment of a conventional driving circuit. In FIG. 2, $AMP_1$ and $AMP_2$ designate differential amplifiers, $INV_1$ $INV_2$, $INV_3$ and $INV_4$ designate inverters; $AND_1$, $AND_2$, $AND_3$ and $AND_4$ designate AND gates; $H_1$ and $H_2$ designate the Hall elements; $Tr_1$, $Tr_2$, $Tr_3$, $Tr_4$, $Tr_5$, $Tr_6$, $Tr_7$ and $Tr_8$ designate transistors; $L_1$, $L_2$, $L_3$ and $L_4$ designate the stator coils; $R_1$, $R_2$, $R_3$, $R_4$, $R_5$, $R_6$, $R_7$, $R_8$, $R_9$, $R_{10}$, $R_{11}$, $R_{12}$ and $R_{13}$ designate resistors; and $C_1$ and $C_2$ designate capacitors. When the rotor magnet 1 is rotating in a direction shown by an allow $1_a$ shown in FIG. 1(a), outputs signals of the Hall elements $H_1$ and $H_2$ at their output terminals $H_{1a}$ and $H_{1b}$ and $H_{2a}$ and $H_{2b}$ are as shown by the waveforms in FIG. 3, as designated by the same marks. Output signals A and B of the inverters $INV_1$ and $INV_3$ are shown by the wave forms designated by the same marks A and B. AB, $A\overline{B}$, $\overline{A}B$ and $\overline{AB}$ of the output signals of the the AND gates $AND_1$, $AND_2$, $AND_3$ and $AND_4$ are designated by the wave forms of the same marks, respectively.

Figure 3:
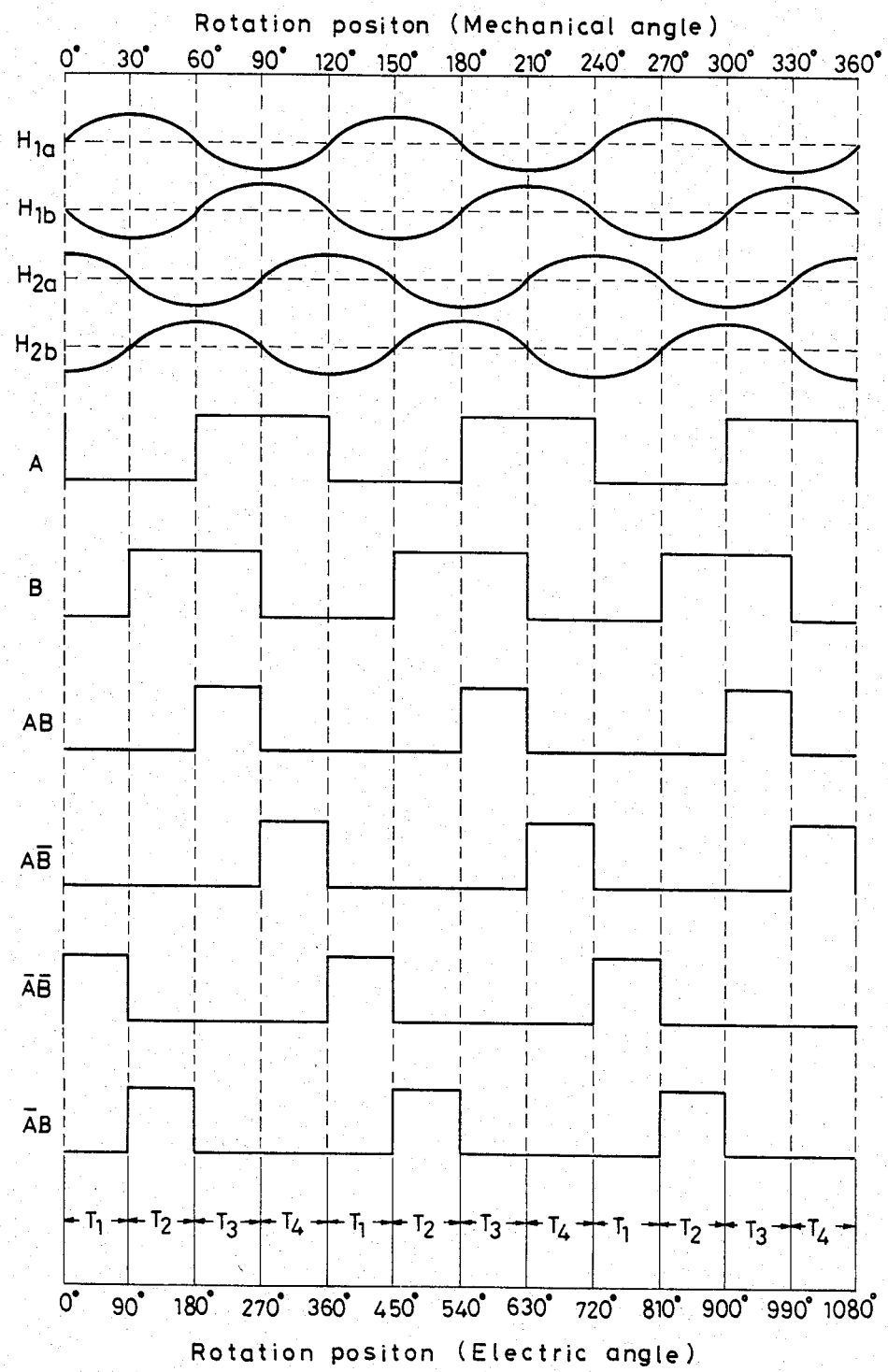
FIG. 3 is the time chart showing operation of the general electronic commutator motor shown in FIG. 1(a), FIG. 1(b) and FIG. 2.

As shown in FIG. 3, output signals of the Hall elements $H_1$ and $H_2$ are waves having a period corresponding to the mechanical angle range between the neighboring different magnetic poles. Accordingly, the wave forms of the output of the Hall elements $H_1$, $H_2$ make one period for 120° of rotation angle of the rotor magnet 1. Accordingly, hereafter rotation angle 120° (mechanical angle 120°) of the rotor magnet 1 is defined as 360° electric angle. On the other hand, the first Hall element $H_1$ and the second Hall element $H_2$ are disposed with 90° mechanical angle difference, and accordingly their output signals $H_{1a}$ and $H_{2a}$ make each other 90° phase difference, and the output $H_{1b}$ and $H_{2b}$ are signals of opposite polarity to those of $H_{1a}$ and $H_{2a}$. The signals $H_{1a}$ and $H_{1b}$ are input to the differential amplifier $AMP_1$ and its output is shaped to square wave A by the inverter $INV_1$, and the signals $H_{2a}$ and $H_{2b}$ are given to the differential amplifier $AMP_2$ and its output is wave-shaped by the interver $INV_3$ to form a wave form B. The square waves A and B have 90° phase difference of electric angle. Then, after obtaining opposite polarity signals $\overline{A}$ and $\overline{B}$ by inverting the output signal A by the inverter $INV_2$ and by inverting the signal B by the inverter $INV_4$, respectively, the outputs of the inverters are passed by logic gates networks consisting of four AND gates $AND_1$, $AND_2$, $AND_3$ and $AND_4$ to produce output signals AB, $A\overline{B}$, $\overline{A}B$, and $\overline{AB}$, respectively. These four output signals have, as shown in FIG. 3, 360° (electric angle) period and each other differ by 90° phase differences. That is, the output signals $\overline{AB}$, $\overline{A}B$, AB and $A\overline{B}$ have wave forms in turn delayed by 90° each. Therefore, by using these pulse signals, desired timing control for electrifying the stator coils $L_1$, $L_2$, $L_3$ and $L_4$ is obtainable.

Let us define that duty-time when the output $\overline{AB}$ is high at $T_1$, that for output $\overline{A}B$ is high at $T_2$, that for AB is high at $T_3$ and that for $A\overline{B}$ is high at $T_4$. Then, at the time period $T_1$, the transistors $Tr_1$ and $Tr_6$ become ON, thereby energizing the coils $L_3$ and $L_1$ by a current from $L_3$ to $L_1$; at the time period $T_2$, the transistors $Tr_3$ and $Tr_8$ become ON thereby energizing the coils $L_4$ and $L_2$ by a current from $L_4$ to $L_2$; at the time period $T_3$, the transistors $Tr_2$ and $Tr_5$ become ON thereby energizing the coils $L_1$ and $L_3$ by a current from $L_1$ to $L_3$; and finally, at the time period $T_4$, the transistors $Tr_4$ and $Tr_7$ become ON thereby energizing the coils $L_2$ and $L_4$ by a current from $L_2$ and $L_4$.

Figure 4:
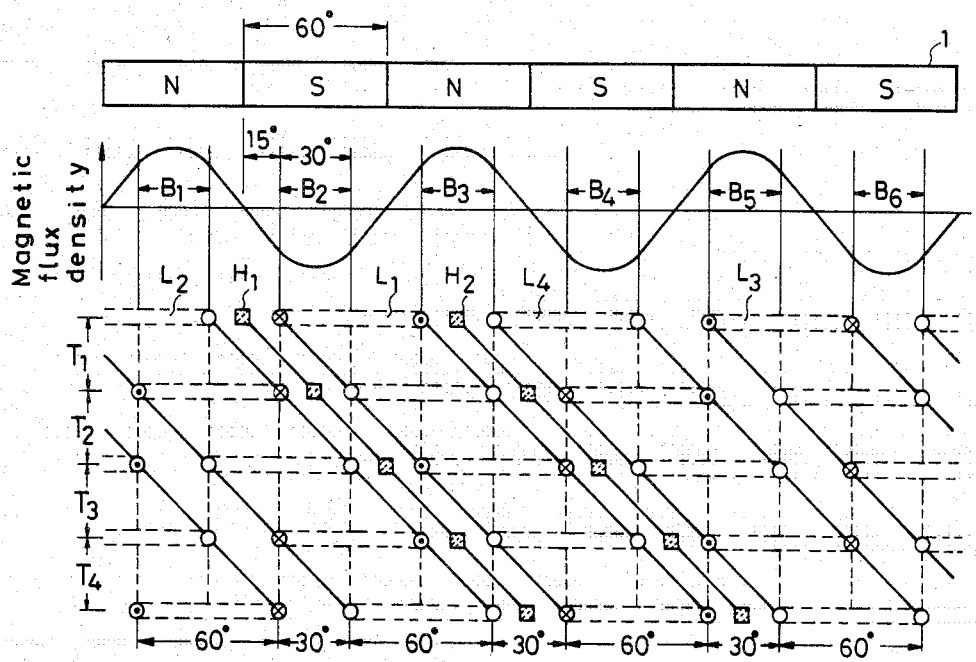
FIG. 4 is a schematic diagram showing relative positions of the stator coils and rotor magnet when the currents in the stator coils are switched, in the electronic commutator motor of FIG. 1(a), FIG. 1(b) and FIG. 2.

Situation of producing torque of the electronic commutator motor is elucidated. As shown in FIG. 4, by the alternative disposition of the magnet poles of the rotor magnet 1, sinusoidal wave-shaped magnetic flux distribution is formed. The stator coils $L_1$, $L_2$, $L_3$ and $L_4$ each are wound in a range spanning for mechanical angle of 60° (namely, angle of pitch of each magnet pole, irrespective of polarity). And these coils $L_1$, $L_2$, $L_3$ and $L_4$ are disposed with mechanical angle difference of 90°. Therefore, when the rotor magnet 1 is rotated, the positional relation between the rotor magnet 1 and stator coils $L_1$, $L_2$, $L_3$ and $L_4$ are as shown in FIG. 4. At the period $T_1$, torque is produced as a product of current of coil $L_1$ and magnetic flux densities of the curve parts $B_2$ and $B_3$, and product of current of coil $L_3$ and magnetic flux of curve parts $B_5$ and $B_6$. At the period $T_2$, torque is produced as a product of current of coil $L_2$ and magnetic flux densities of the curve parts $B_1$ and $B_2$, and product of current of coil $L_4$ and magnetic flux of curve parts $B_4$ and $B_5$. At the period $T_3$, torque is produced as a product of current of coil $L_1$ and magnetic flux densities of the curve parts $B_3$ and $B_4$, and product of current of coil $L_3$ and magnetic flux of curve parts $B_6$ and $B_1$. At the period $T_4$, torque is produced as a product of current of coil $L_2$ and magnetic flux densities of the curve parts $B_2$ and $B_3$, and product of current of coil $L_4$ and magnetic flux of curve parts $B_5$ and $B_6$.

Figure 5:
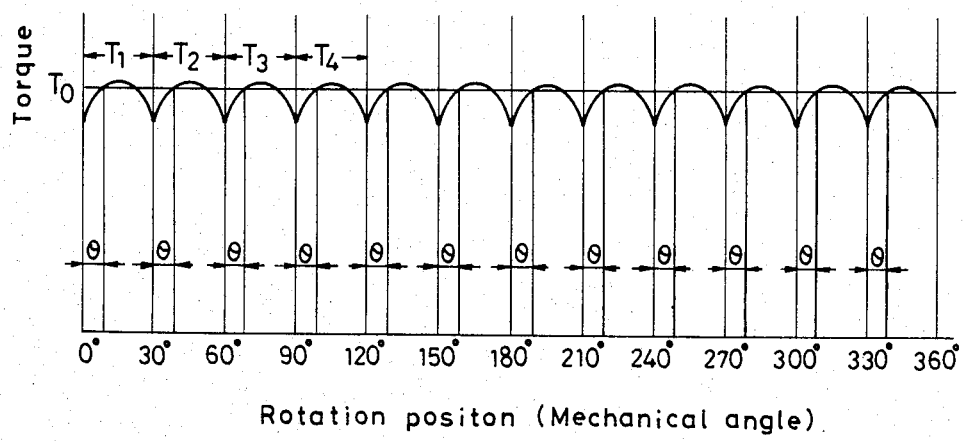
FIG. 5 is a time chart showing torque ripple in the electronic commutator motor of FIG. 1(a), FIG. 1(b) and FIG. 2.

Magnetic flux density curves $B_1$, $B_2$, $B_3$, $B_4$, $B_5$ and $B_6$ have the same wave forms, and therefore, if the currents fed to the coils $L_1$, $L_2$, $L_3$ and $L_4$ are constant, the torque of the electronic commutator motor fluctuates in 360° mechanical angle as shown in FIG. 5. That is, one rotation, (i.e. 360° mechanical angle), has twelve repetitions of the same torque ripple patterns each has 30°.

Feature of the present invention is devised from the above-mentioned fact that the torque ripple consists of repeated fluctuation patterns of the same type.

Figure 7:
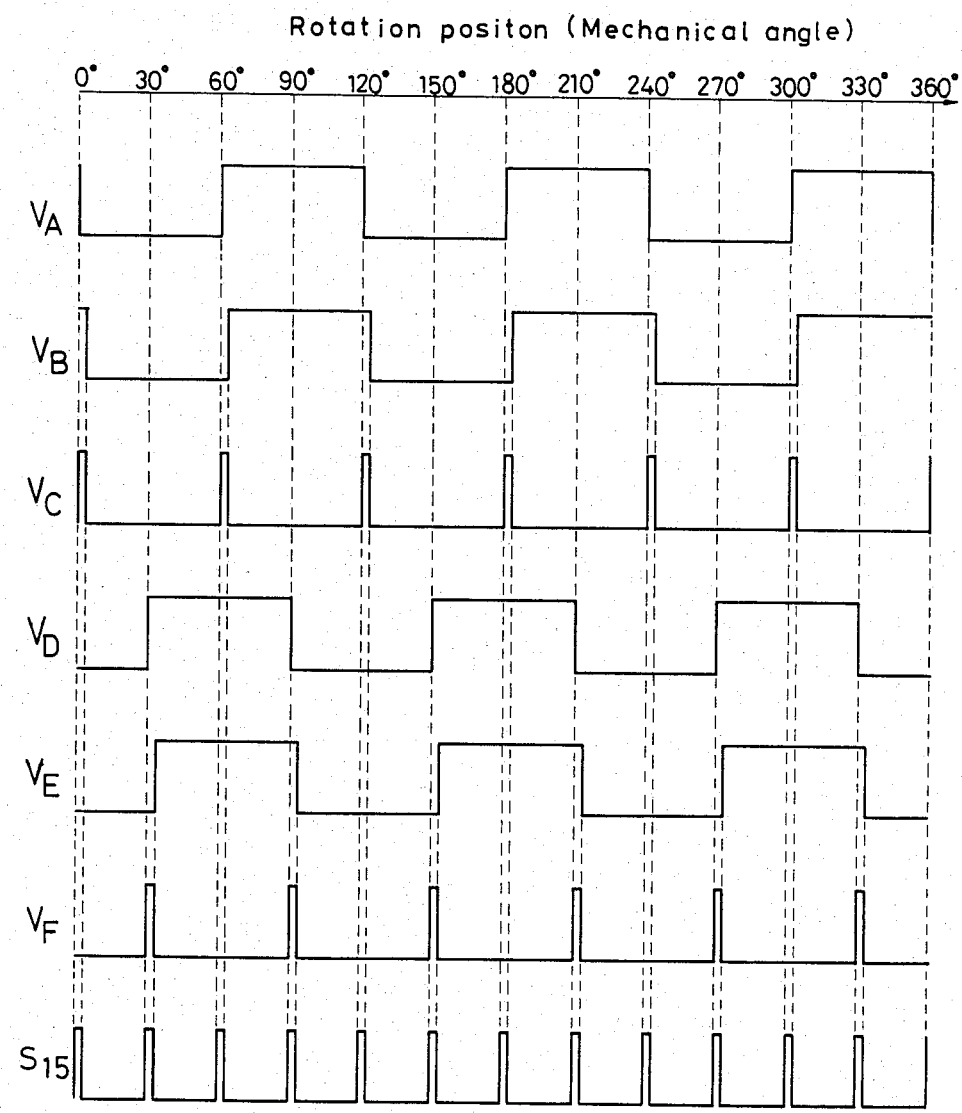
FIG. 7 is a timing chart showing the operation of the circuit of FIG. 6.

A first embodiment in accordance with the present invention is described in detail with reference to FIG. 6, FIG. 7 and FIG. 8 as follows.

FIG. 6 is a block diagram showing a first embodiment of the present invention. Numeral 3 designates a DC brushless motor, i.e., an electronic commutator motor, which is the same as that shown in FIG. 1(a) and FIG. 1(b), namely having a rotor magnet 4 of six magnetic poles of the same configuration as FIG. 1(a) and a stator coil printed circuit substrate 5 having the same configuration as shown in FIG. 1(b), and also has a frequency generator 6 consisting of an $LED_1$, a photoelectric element $P_1$ and a rotary encoder disc $R_1$ fixedly mounted on a shaft 7 of rotor magnet 4. Output signal of Hall element $H_3$ mounted on the stator coil printed circuit substrate is wave-formed by means of known wave-forming circuit 8, thereby to be converted to pulse signal $V_A$. The pulse signal $V_A$ is input to delay circuit 9 to produce a delayed signal $V_B$, and then both the signals $V_A$ and $V_B$ are given to an exclusive OR gate 10, which produces rotation position signal $V_C$, thereby the signal output from a Hall element on the stator coil printed circuit substrate 5 is wave-formed by another waveform circuit 11 to produce a pulse signal $V_D$. The pulse signal $V_D$ is given to a delay circuit 12 which outputs signal $V_E$, and both signals $V_D$ and $V_E$ are given to another exclusive OR gate 13, which produces rotation position signal $V_F$. The above-mentioned rotation position signals $V_C$ and $V_F$ are given to an OR gate 14, which produces a rotation position signal $S_{15}$ comprised of twelve pulses for every one rotation of the rotor magnet 4. FIG. 7 shows wave forms of signals $V_A$, $V_B$, $V_C$, $V_D$, $V_D$, $V_E$ and $V_F$, and further the rotation position signal $S_{15}$. The rotation position signal $S_{15}$ is a signal comprised of pulses which rise up at every 30° rotation of the rotor magnet 4. And it is constituted that current feedings to the stator coils $L_1$, $L_2$, $L_3$ and $L_4$ are switched at timings of every rising-ups of the pulses.

Signals output from the frequency generator 6 is wave-formed by a wave-forming circuit 16 to produce rotation fine position signal $S_{17}$. The encoder disc $R_1$ is configurated to have slits of a number of $12 \times N_1$, wherein $N_1$ is an integer of 2 or larger, and therefore the rotation fine position signal $S_{17}$ has pulses of a number of $12 \times N_1$ for every one rotation of the rotor magnet 4. That is, in a time period from one rise-up of the rotation position signal $S_{15}$ to a rise-up of the next pulse of the same signal, the rotation fine position signal $S_{17}$ and $N_1$ pulses, and therefore by counting the number from every rise-up of the rotation position signal $S_{15}$, rotation fine position of the rotor magnet 4 can be detected.

A torque compensation circuit 18 is comprised of a rotation fine position signal counter 19 which counts the number of pulses of rotation fine position signal $S_{17}$ from each rise-up of the pulse of the rotation position signal $S_{15}$ and issues count output $S_1$, and a memory 20 which stores compensation component value in digital code for each fine rotation position of the rotor magnet, and a gain control circuit 21 which receives output of the memory 20 for making gain control of a motor control signal $S_2$ by amplifying or attenuating it in order to make currents of the stator coils thereby to produce uniform torque through converting the digital output of the memory 20 to analog signal. The rotation fine position signal counter 19 is reset at each rise of pulse of the rotation position signal $S_{15}$ from the OR gate 14, and counts pulses of rotation fine signal $S_{17}$. Accordingly, the resulted count shows rotation fine position from each switching time of the current in the stator coils.

For the memory 20, usually a read only memory (hereinafter is referred to as ROM) is used, and in respective addresses of this memory, data for use to compensate torque ripple for respective rotation fine positions in each range of partitioned angle (in this embodiment $360°/12 = 30°$) are stored. Accordingly, when an output of the rotation fine position signal counter 19 is given as an address signal, the memory 20 issues compensation signal $S_3$ for necessary compensation.

Figure 8:
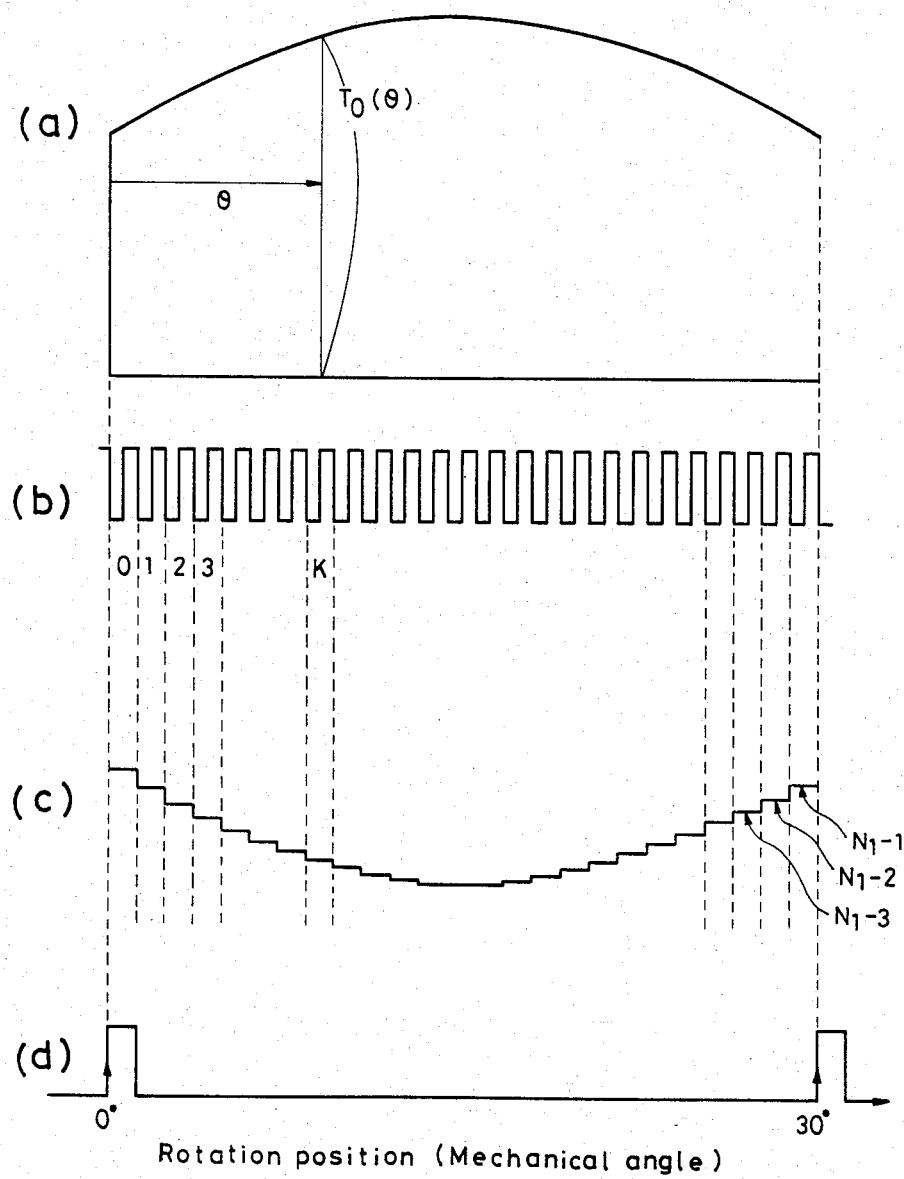
FIG. 8 is a time chart showing the operation of the embodiment of the present invention.

FIG. 8 shows waveforms related to the compensation signal $S_3$. As has been described with reference to FIG. 5, switching of the current of stator coil are made at 0°, 30°, 60°, 90°, 120°, 150°, 180°, 210°, 240°, 270°, 300°, 330° and 360°, and within each partition angle range for 30°, magnetic flux distribution changes in the same pattern as shown in FIG. 8(a). In other words, since the torque before compensation of torque ripple as shown in FIG. 5 has repetition of twelve convex waveforms of the same pattern, it is sufficient with that the memory 20 stores compensation data for each partition angle-range of 30° only, and the same compensation data are used for every convex waveforms of torque. Thus, the way of compensation for a 0°–30° partition angle-range only is described below, and the same applies for other partition angle ranges.

FIG. 8(a) shows a curve of torque fluctuation for rotation fine angle of 0°–30° range. FIG. 8(b) shows pulses of rotation fine position signal $S_{17}$. FIG. 8(c) shows data in the memory 20 for torque ripple compensation represented in analogue way. FIG. 8(d) shows rotation position signal $S_{15}$. As has been described, the encoder disc $R_1$ has $12 \times N_1$ slits, and accordingly, as the rotor magnet 4 rotates the rotation fine position signal $S_{17}$ gives $N_1$ pulses for rotation fine angle of 0°–30° range. Torque $T_0(\theta)$ for the rotation fine angle $\theta$ is given by the following equation (1):

$$T_0(\theta) = K_1 \cdot B(\theta) \cdot I_M \cdot l \qquad (1)$$

wherein $0° \leq \theta \leq 30°$, $K_1$ is a constant, $B(\theta)$ is magnetic flux density at rotation fine angle of $\theta$, $I_M$ is motor driving current, i.e., stator current and $l$ is stator coil length.

As shown in equation (1), the convex-shaped change of the torque $T_0(\theta)$ is induced by the change of the magnetic flux density $B(\theta)$ which changes as shown in FIG. 4. Accordingly, when a compensation function $D_C(\theta)$ is defined by the following equation (2):

$$D_C(\theta) = K_2 \cdot \frac{1}{B(\theta)}, \qquad (2)$$

wherein $K_2$ is a constant, then, by utilizing this function and motor control signal $S_2$ which is for the motor to rotate at stable speed, the stator coil current $I_M$ is compensatedly controlled in the gain control circuit 21, and the following compensated current $I_M(\theta)$ is obtainable:

$$I_M(\theta) = D_C(\theta) \cdot Ia \qquad (3)$$
$$= K_2 \cdot Ia \cdot \frac{1}{B(\theta)},$$

wherein $Ia$ is a mean value of the current which is constant.

Accordingly, the torque $T_C(\theta)$ after compensation is given as follows:

$$T_C(\theta) = K_1 \cdot B(\theta) \cdot I_M(\theta) \cdot l \qquad (4)$$
$$= K_1 \cdot B(\theta) \cdot K_2 \cdot Ia \cdot \frac{1}{B(\theta)} \cdot l$$
$$= K_1 \cdot K_2 \cdot Ia \cdot l.$$

Thus, a constant torque irrespective of the rotation fine position $\theta$ is obtainable and torque ripple in the rotation of the rotor magnet is drastically reduced.

Since the memory 20 is embodied by the ROM, the compensation data stored in the ROM are digital data, represented as $D_{RC}(K)$. The torque compensation data $D_{RC}(K)$ are stored in addresses of from 0 to ($N_1 - 1$), and upon reception of a rise-up of pulse of rotation position signal $S_{15}$, the rotation fine position signal counter 19 is reset to the output of count 0, and therefore the address to be accessed in the ROM 20 is reset to address 0. And as pulses of the rotation fine position signal $S_{17}$ come in sequence, the address advances to 1, 2, 3, . . . in sequence, thereby outputting compensation data $S_3$ which can be represented in analoque way by curve (c) of FIG. 8 to the gain control circuit 21 as the torque compensation signal $S_3$.

Hereupon, the compensation data $D_{RC}(K)$ stored in the address K of the ROM is represented as follows:

$$D_{RC}(K) = K_2 \cdot \frac{1}{B(\theta_K)}, \qquad (5)$$

$$\theta_K = 30° \times \frac{K_3}{N_1}, \qquad (6)$$

wherein $K_3$ is a constant and $\theta_K$ is the fine position at the K-th pulse of the rotation fine signal.

Since the rotation position signal $S_{15}$ is issued at every 30° position of the rotor magnet 4, it has the following advantages in comparison with the driving circuit for electronic commutator motor using only one rotation position signal issued for 360° rotation:

(1) Since controlling is made by dividing 360° of rotation of the rotor magnet into a predetermined number (for example, 12 in this embodiment), capacity of the memory 20 (the ROM in this embodiment) can be decreased to 1/12 of a circuit using only one rotation position signal.

(2) The rotation fine position signal counter 19 counts pulses of rotation fine position signal $S_{17}$ and the counting is reset by a pulse of the rotation position signal $S_{15}$ from the OR gate 14; and in this case, since the rotation fine position signal counter 19 is reset for a predetermined times during one (mechanical 360°) rotation of the rotor magnet, for instance 12 times in the above-mentioned example, the capacity of the counter 19 can be small in comparison with such case the counter is reset only one time for one (mechanical 360°) rotation of the rotor magnet and counting of the pulses of rotation fine position signal $S_{17}$ is made in sequence without resetting within one rotation.

In this example, control signals for energizing the stator coils are utilized as the rotation position signal $S_{15}$, but in a modified example, the rotation position signal can be produced by forming twelve slits on the encoder disc $R_1$ at a radial position different from the circular row of $12 \times N_1$ slits for rotation fine position signal $S_{17}$ and providing an additional LED and an additional photoelectric element to produce the rotation position signal as follows:

A second embodiment of the present invention is described with reference to FIG. 9, FIG. 10, FIG. 11, FIG. 12 and FIG. 13.

Figure 9:
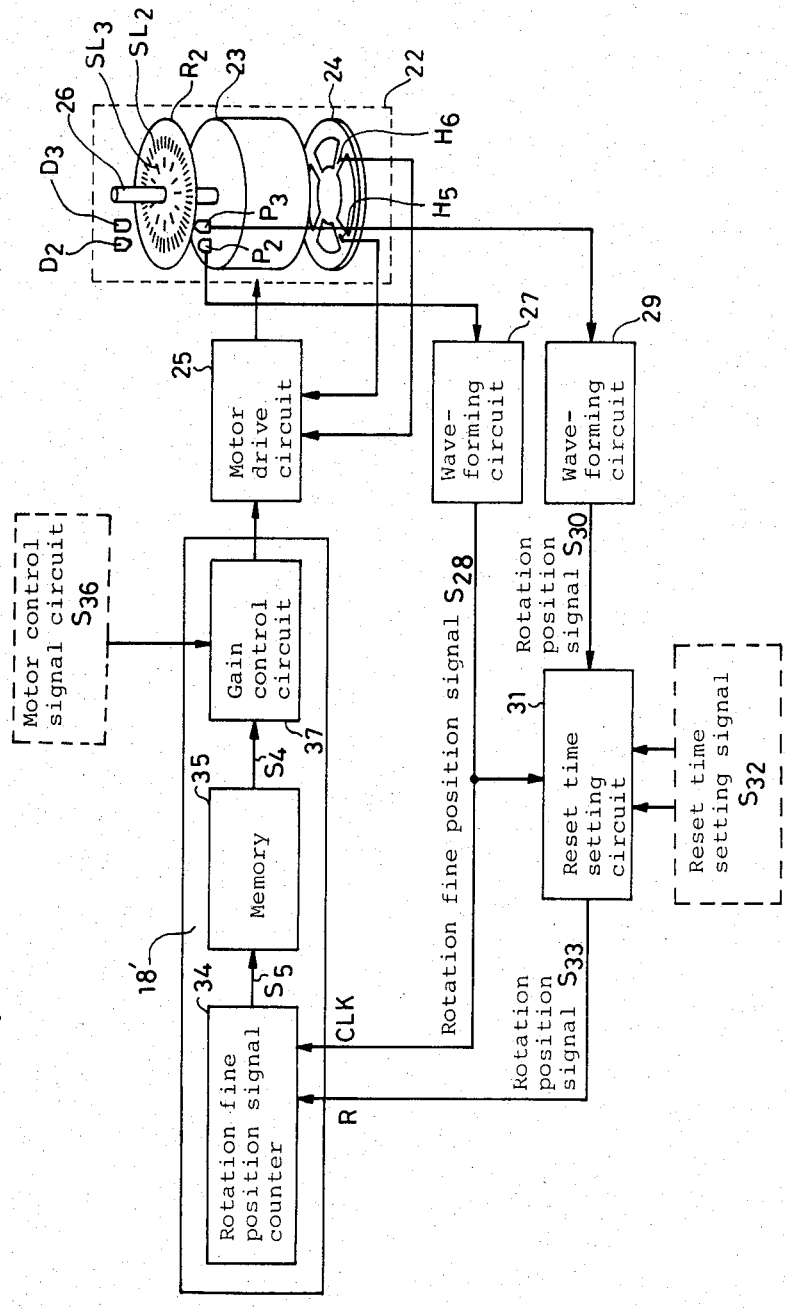
FIG. 9 is a block diagram of a second embodiment in accordance with the present invention.

FIG. 9 shows block diagram of the second embodiment, wherein an electronic commutator motor 22 has the same configuration as the electronic commutator motor 3 in FIG. 1(a), FIG. 1(b) and FIG. 6, having a rotor magnet 23 with six magnetic poles and a stator coil printed circuit substrate 24 with four stator coils. The motor also has a rotary encoder disc $R_2$ having two rows of slits $SL_2$ and $SL_3$ and two light emitting diodes $D_2$ and $D_3$, and two photoelectric elements $P_2$ and $P_3$. A motor drive circuit 25 is the same as that in FIG. 2, and is for feeding stator current switched by signals from the Hall elements $H_5$ and $H_6$ of the stator coil printed circuit substrate 24. The rotary encoder disc $R_2$ and the rotor magnet 23 of the electronic commutator motor 22 are fixedly mounted on a shaft 26. Outside circular row of the slit $SL_2$ has $12 \times N_2$ slits and issues $12 \times N_2$ pulses by one (mechanical 360°) rotation of the rotor magnet 23 from the photoelectric element P₂, and the obtained pulses are given to a known waveforming circuit 27 to produce rotation fine position signal $S_{28}$, which is given to a fine position signal counter 34, which is the same one as the fine position signal counter 19 of FIG. 6. The inside row of slits $SL_3$ is provided with 12 slits, and accordingly the photoelectric element $P_3$ receives the light through the slits $SL_3$ producing 12 pulses for one (mechanical 360°) rotation of the rotor magnet 23. The pulses from the photoelectric element $P_3$ is waveformed by a known waveforming circuit 29 and produces rotation position signal $S_{30}$, which is given to a reset timing circuit 31, which also receives rotation fine position signal $S_{28}$ from the wave forming circuit 27. The reset time setting circuit 31 also receives reset time setting signals $S_{32}$ from outside circuit and the reset timing signal $S_{32}$ makes the rotation position signal $S_{30}$ delayed by a small time period for a predetermined number of pitch of pulses of the rotation fine position signal $S_{28}$ and the delayed rotation position signal $S_{33}$ is given to the fine position signal counter 34 as reset signal.

As a result of the above-mentioned configuration, $N_2$ pulses of the rotation fine position signal is counted for a time period of between two rise-ups of pulses of the rotation position signal $S_{33}$. And the number counted by the counter 34 corresponds to the rotation fine position of the rotor magnet 23, and the count is given to the memory 35. The compensation circuit 18' of the embodiment, which is the same as that in FIG. 6, comprises the rotation fine position signal counter 34 for counting pulses of rotation fine position signal $S_{28}$ from the wave-forming circuit 27 for a time period defined by two rise-ups of the pulses of rotation position signal $S_{33}$ from the reset time setting circuit 31, a memory 35 for storing compensation data for respective rotation fine position signal $S_5$ in the partitioned time period between the two rise-ups of the pulses of the rotation position signal $S_{33}$, and a gain control circuit 37 for making gain control of a motor control signal $S_{36}$ by amplifying or attenuating it responding to compensation signal from the memory 35.

The counter 34 is constituted to be reset by the rise-ups of the pulses of the rotation position signal $S_{33}$ and counts pulses of the rotation fine position signal $S_{28}$ from the wave forming circuit 27, thereby producing count corresponding to rotation fine position of the rotor magnet 23.

The memory 35 is usually a read only memory (ROM), and stores compensation data for use in compensating the undesirable torque ripple to obtain uniform torque of the electronic commutator motor, and issues compensation data output responding to input signal as address signal of the counter 34.

Figure 10:
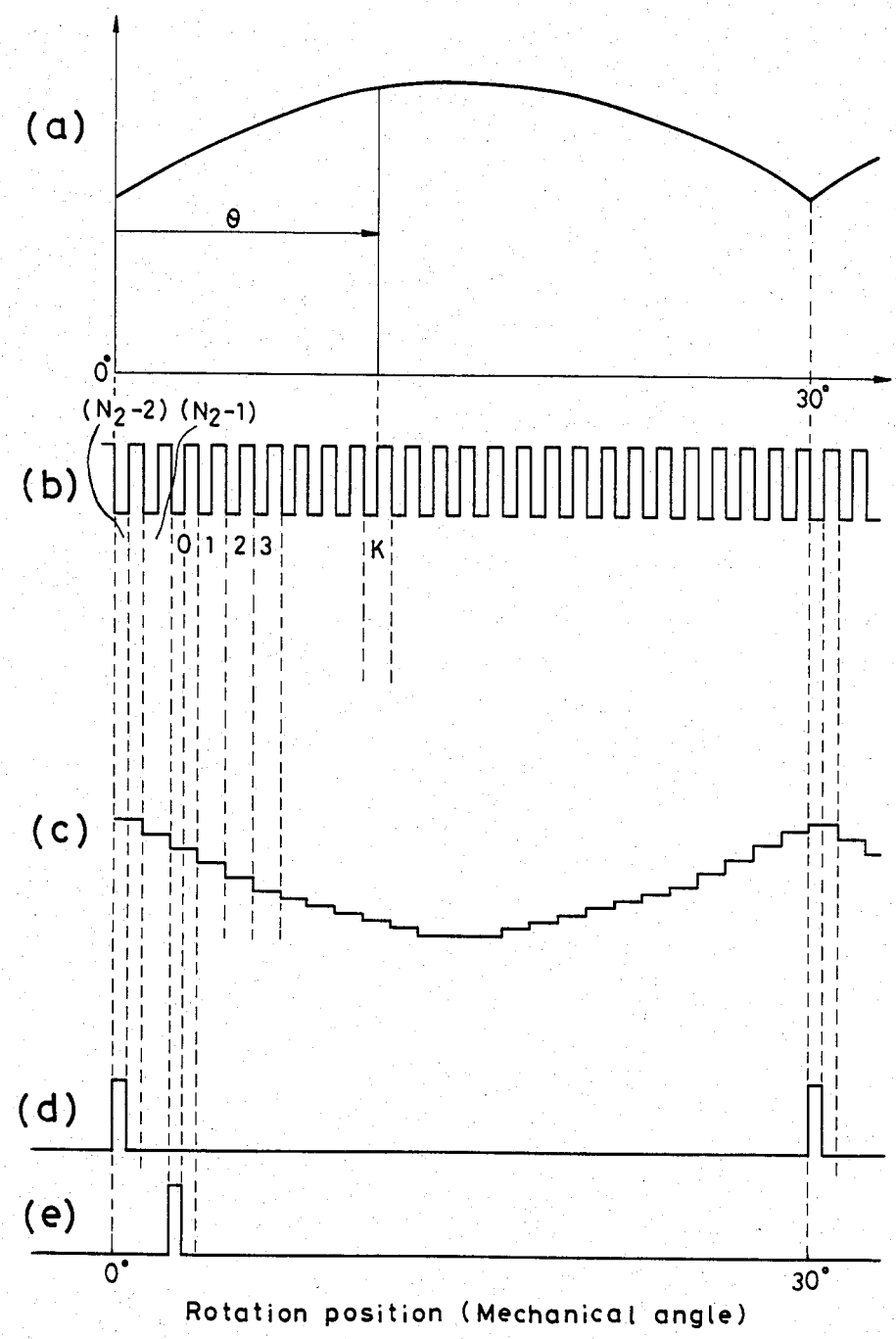
FIG. 10, FIG. 11 and FIG. 12 are time charts showing the operations of the embodiments of the present invention.

FIG. 10 shows operation of this embodiment.

FIG. 10 shows waveforms related to the compensation signal $S_4$. As has been described with reference to FIG. 5, switching of the current of stator coil are made at 0°, 30°, 60°, 90°, 120°, 150°, 180°, 210°, 240°, 270°, 300°, 330° and 360°, and within each partition angle range for 30°, magnetic flux distribution changes in the same pattern as shown in FIG. 10(a). In other words, since the torque before compensation of torque ripple as shown in FIG. 5 has repetition of twelve convex waveforms of the same pattern, it is sufficient with that the memory 35 stores compensation data for each partition angle-range of 30° only, and the same compensation data are used for every convex waveforms of torque.

Thus, the way of compensation for a 0°–30° partition angle-range only is described below, and the same applies for other partition angle ranges.

FIG. 10(a) shows a curve of torque fluctuation for rotation fine angle of 0°–30° range. FIG. 10(b) shows pulses of rotation fine position signal $S_{28}$. FIG. 10(c) shows data in the memory 35 for torque ripple compensation represented in analogue way.

Curve (d) of FIG. 10 shows rotation position signal $S_{30}$ of the case when positional relation between the rotary encoder disc $R_2$ and the rotor magnet 23 is in a good agreement. Curve (e) of FIG. 10 shows delayed rotation position signal $S_{33}$ from the reset time setting circuit 31. Now provided that, one pulse of the pulse train of the rotation fine position signal $S_{28}$ is defined as a clock pulse, the delayed rotation position signal $S_{33}$ is delayed by a time period of two clock pitches by the reset time setting circuit 31 for adjustment. The curve (c) has a shape which is inversely proportional to the curve (a). The reason why the adjusted rotation position signal $S_{33}$ is delayed by two clock period from that of the signal $S_{30}$ is that compensation of time lag of the output signal $S_{30}$ could be compensated of the disagreement within the pitches of ±2 clock pulses.

Torque $T_0(\theta)$, which is the torque of the electronic commutator motor when the rotation position in mechanical angle is $\theta°$ as shown in (a) of FIG. 10, is represented by the following equation:

$$T_0(\theta) = K_3 \cdot B(\theta) \cdot I_M \cdot l \qquad (7),$$

wherein $K_3$ is a constant.

As shown in equation (7), the magnetic flux density $B(\theta)$ changes corresponding to change of rotation position $\theta°$.

Accordingly, when a compensation function $D_C(\theta)$ is defined by the following equation (8):

$$D_C(\theta) = K_4 \cdot \frac{1}{B(\theta)}, \qquad (8)$$

wherein $K_4$ is a constant.

Then, by utilizing this function and motor control signal $S_{36}$ which is for the motor to rotate at stable speed, the stator coil current $I_M$ is compensatedly controlled in the gain control circuit 37, and the following compensated current for $I_M(\theta)$ for the rotation position angle $\theta°$ is obtainable:

$$I_M(\theta) = D_C(\theta) \cdot Ia, \qquad (9)$$
$$= K_4 \cdot Ia \cdot \frac{1}{B(\theta)}$$

wherein $K_4$ is a constant.

Accordingly, the torque value $T_C(\theta)$ after compensation is given as follows:

$$T_C(\theta) = K_3 \cdot B(\theta) \cdot I_M(\theta) \cdot l \qquad (10)$$
$$= K_3 \cdot B(\theta) \cdot K_4 \cdot Ia \cdot \frac{1}{B(\theta)} \cdot l$$
$$= K_3 \cdot K_4 \cdot Ia \cdot l.$$

As is shown in the equation (10), the $T_C(\theta)$ becomes independent from the rotary fine position $\theta$. That is, the compensated torque becomes uniform irrespective of the rotation position.

Since the memory 35 is embodied by the ROM, the compensation data $D_{RC}(K)$ stored in the ROM are digital data as shown in FIG. 10(c). The torque compensation data $D_{RC}(K)$ are stored in addresses from 0 to $(N_2-1)$, and upon reception of a rise-up of pulse of rotation position signal $S_{33}$, the rotation fine position signal counter 34 is reset to the output of count 0, and therefore the address to be accessed in the ROM 35 is reset to address 0. And as pulses of the rotation fine position signal $S_{28}$ come in sequence, the address advances to 1, 2, 3, . . . in sequence, thereby outputting compensation data $S_4$ to the gain control circuit 37 as the torque compensation signal $S_4$.

Hereupon the compensation data $D_{RC}(K)$ stored in the address K of the ROM is represented as follows:

$$D_{RC}(K) = K_4 \cdot \frac{1}{B(\theta_K)} \tag{11}$$

$$\theta_K = 30° \times \frac{(K+2)}{N_2} . \tag{12}$$

The above-mentioned operation case is the case that a rotary encoder disc $R_2$ and the rotor magnet 23 are in good positional agreement each other. However, in manufacturing the electronic commutator motor, it is not necessarily possible to construct the rotor magnet 23 and the rotary encoder disc $R_2$ in accurate agreement in designed position. Therefore, the present embodiment can adjust rotating position disagreement between the rotor magnet 23 and the rotary encoder disc $R_2$ by the extent of fine position angles for two slits which corresponds to $\pm 2$ clock pulses. Firstly, FIG. 11 shows a case that the rotation position signal $S_{30}$ from the wave-forming circuit 29 advances by two clock pitches from the accurate agreement position.

Figure 11:
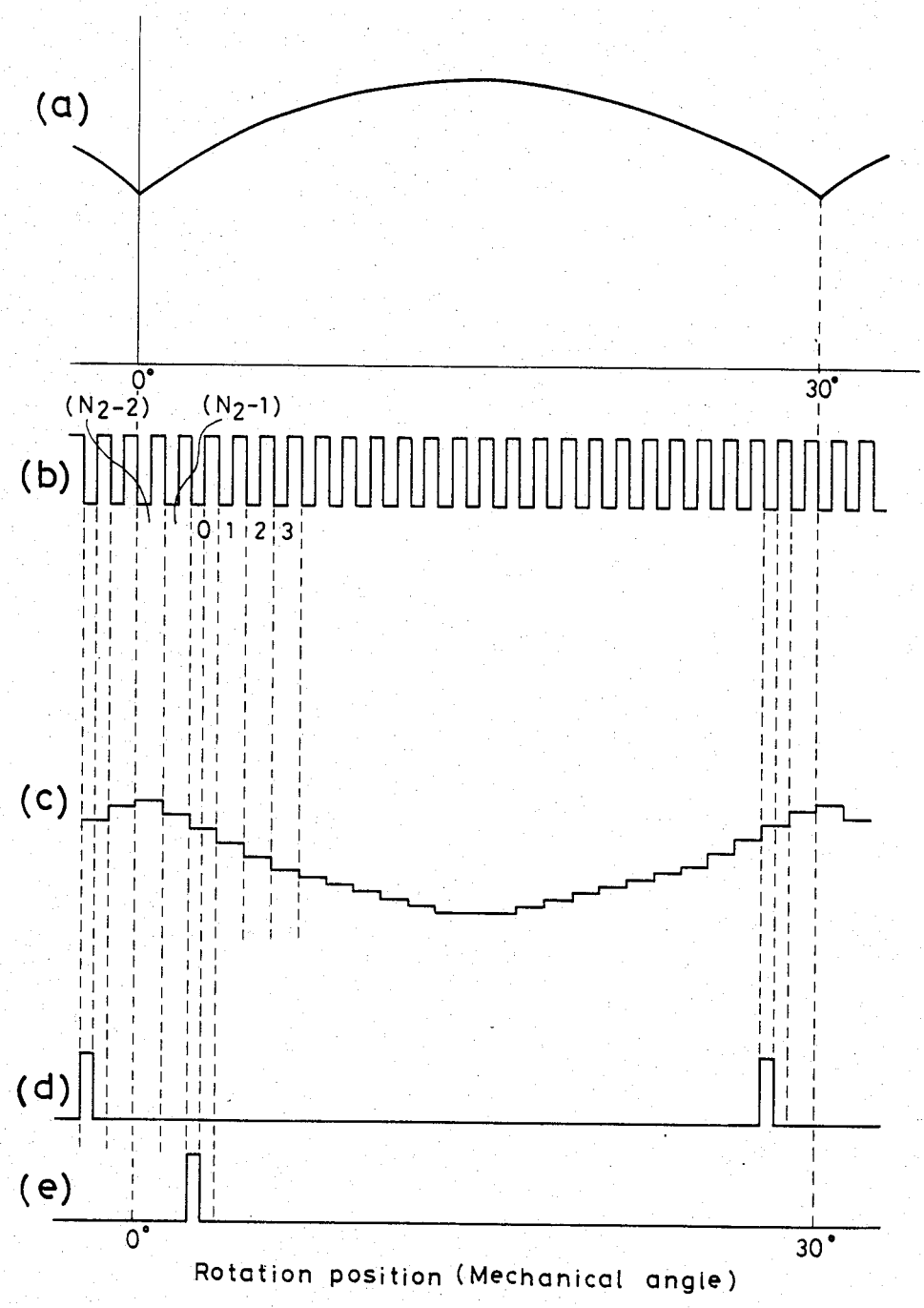

FIG. 11, curve (a) shows a curve of torque fluctuation for rotation fine angle of 0°–30° range. FIG. 11, curve (b) shows pulses of rotation fine position signal $S_{28}$. FIG. 11, curve (c) shows data in the memory 35 for torque ripple compensation represented in analogue way.

Curve (d) of FIG. 11 shows rotation position signal $S_{30}$, and this signal is leading by two clock pitches from the case of signal (d) of FIG. 10. In this case, by utilizing the reset time setting circuit 31, the timing is delayed by a time period of four clocks, thereby to obtain a signal shown by a curve (e) of FIG. 11, which shows delayed rotation position signal $S_{33}$ from the reset timing circuit 31. In such way, a torque ripple compensation signal of a pattern of (c) of FIG. 11 is obtainable with adjusting timing. Thus the compensation signal $S_4$ has the right rotation position like the curve (c) of FIG. 10.

Figure 12:
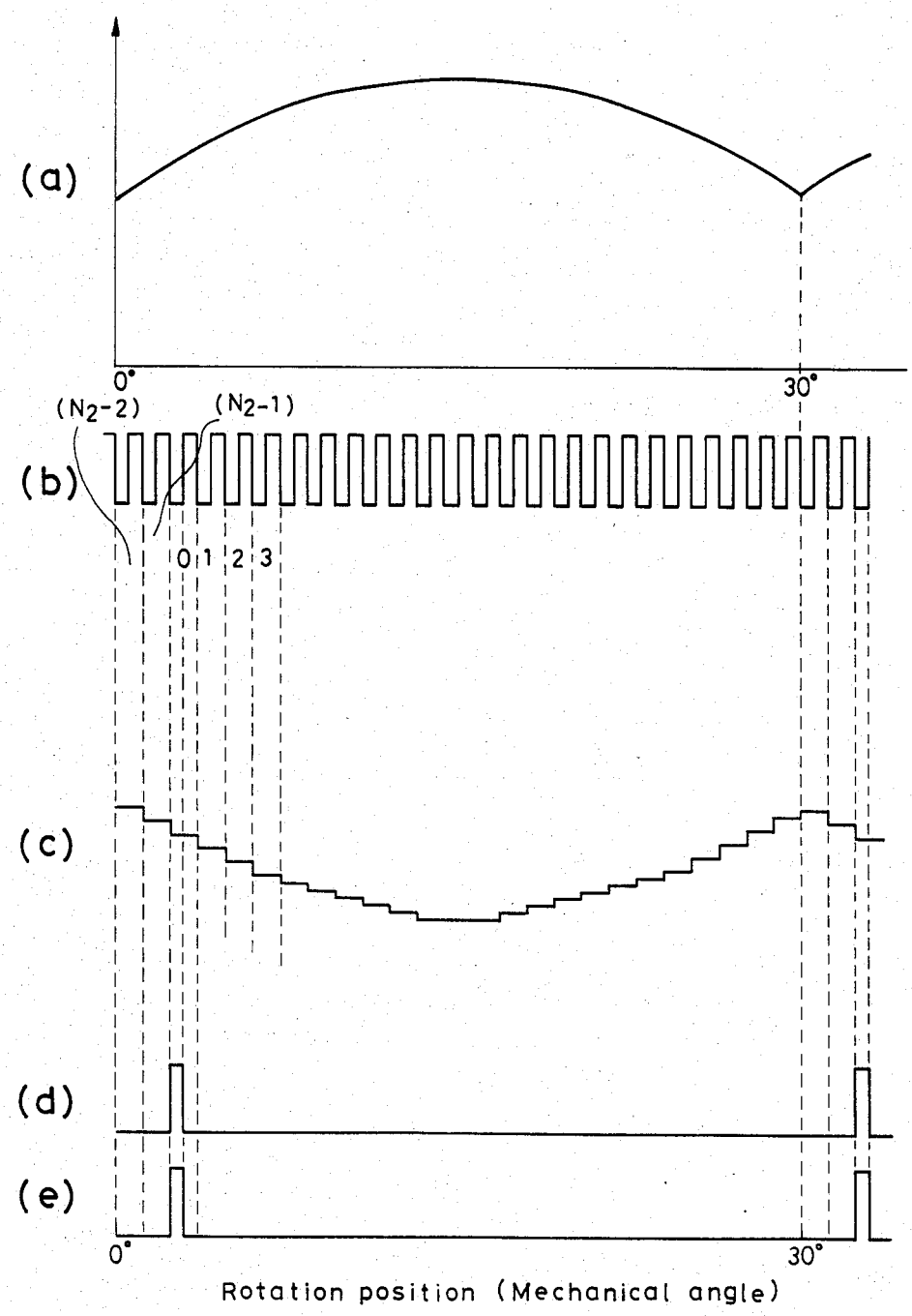

Nextly, the case of operation when the rotation position signal $S_{30}$ lags from the intended rotation position of the rotor magnet 23 by two clock pitches is described with reference to FIG. 12. Curve (a) of FIG. 12 shows a curve of torque fluctuation for rotation fine positions in angle range of 0°–30°; curve (b) of FIG. 12 shows pulses of rotation fine position signal $S_{28}$; curve (c) of FIG. 12 shows data in the memory 35 for torque ripple compensation in analogue way; curve (d) of FIG. 12 shows rotation position signal $S_{30}$ which lags by two clock pitches from the corresponding case of (d) of FIG. 10. In this case, as a result of utilizing the reset time setting circuit 31, the timing is not delayed at all, thereby to obtain a signal shown by a curve (e) of FIG. 12, which shows adjusted rotation position signal $S_{33}$. By such adjustment, a torque ripple compensation signal of a pattern of (c) of FIG. 12 is obtainable with adjusted timing. Thus, the compensation signal $S_4$ has the right rotation positions like the curve (c) of FIG. 10.

Figure 13:
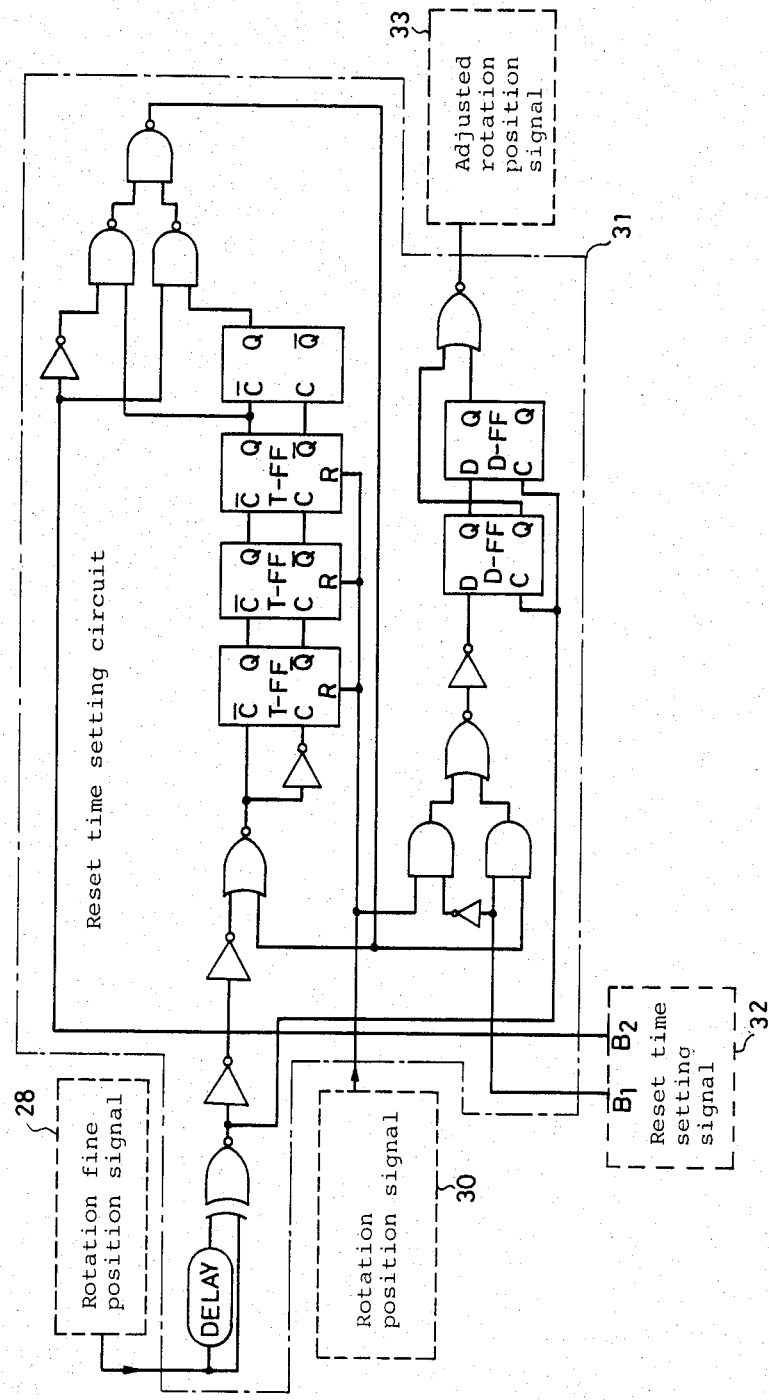
FIG. 13 is a circuit diagram of one example of reset timing circuit in FIG. 9.

FIG. 13 shows one example of the reset time setting circuit 31. Signals $B_1$ and $B_2$ reset time setting of the signal 32 are input to the terminals $B_1$ and $B_2$. When $B_1$ is of L level, amount of delay is 0 as shown in FIG. 12, when $B_1$ is of H level and $B_2$ is of L level the amount of delay is two clock pitches as shown in FIG. 10, when both $B_1$ and $B_2$ are of H level the amount of delay is four clock pitches as shown in FIG. 11; thus by selecting the reset time setting signal 32 three ways of delay are selectable, and accordingly even if the rotation position signal 30 and the angular position of the rotor magnet do not agree in the rotation position, the electric adjustment can compensate such disagreement.

If further, fine adjustment of delay period is desired, more fine adjustment or in wider range can be made.

As other embodiment, output signal from the Hall elements $H_5$ and $H_6$ for selecting the stator coils may be used instead of the signal $S_{30}$ as the rotation position signal.

A third embodiment of the present invention is described with reference to FIG. 14, FIG. 15, FIG. 16, FIG. 17, FIG. 18, FIG. 19 and FIG. 20.

Figure 14:
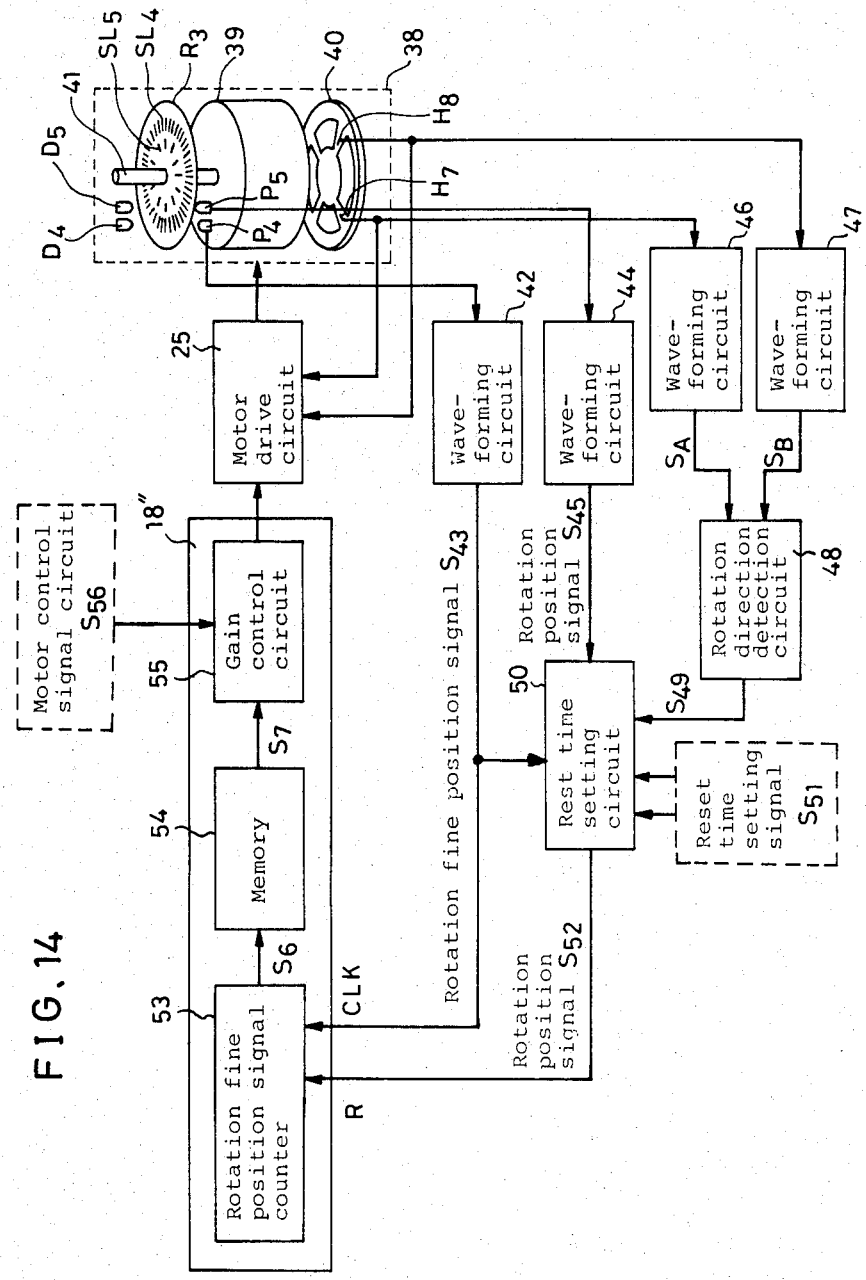
FIG. 14 is a block diagram of a further modified embodiment in accordance with the present invention.

FIG. 14 shows block diagram of the third embodiment, wherein an electronic commutator motor 38 has the same configuration as the electronic commutator motor 3 in FIG. 1(a), FIG. 1(b) and FIG. 6, having a rotor magnet 39 with six magnetic poles and a stator coil printed circuit substrate 40 with four stator coils. The motor also has a rotary encoder disc $R_3$ having two rows of slits $SL_4$ and $SL_5$ and two light emitting diodes $D_4$ and $D_5$, and two photoelectric elements $P_4$ and $P_5$. A motor drive circuit 25 is the same as that in FIG. 2 and is for feeding stator current switched by signals from the Hall elements $H_7$ and $H_8$ of the stator coil printed circuit substrate 40. The rotary encoder disc $R_3$ and the rotor magnet 39 of the electronic commutator motor 38 are fixedly mounted on a shaft 41. Outside circular row of the slit $SL_4$ has $12 \times N_3$ slits and issues $12 \times N_3$ pulses by one (mechanical 360°) rotation of the rotor magnet 39 from the photoelectric element $P_4$, and the obtained pulses are given to a known wave-forming circuit 42 to produce rotation fine position signal $S_{43}$, which is given to a fine position signal counter 53, which is the same one as the fine position signal counter 19 of FIG. 6. The inside row of slits $SL_5$ is provided with 12 slits, and accordingly the photoelectric element $P_5$ receives the light through the slits $SL_5$ producing 12 pulses for one (mechanical 360°) rotation of the rotor magnet 39. The pulses from the photoelectric element $P_5$ is waveformed by a known wave-forming circuit 44, and produces rotation position signal $S_{45}$, which is given to a reset time setting circuit 50, which also receives rotation fine position signal $S_{43}$ from the wave-forming circuit 42.

Output signal from the Hall elements $H_7$ and $H_8$ are wave-formed by a wave-forming circuit 46, which is configured similarly to a wave-forming circuit part in FIG. 2 comprising the resistors $R_1$, $R_2$, $R_5$, the differential amplifier $AMP_1$ and the inverter $INV_1$ and by another wave-forming circuit 46, which is configurated similarly to another wave-forming part in FIG. 2 comprising the resistors $R_3$, $R_4$, $R_6$, the differential amplifier $AMP_2$ and the inverter $INV_3$, and the output signals $S_A$, $S_B$ of the wave-forming parts are input to a rotation direction detection circuit 48. Since the signals from the Hall elements $H_7$ and $H_8$ have phase a difference of 90° with each other, by utilizing relation of lag and lead of signals the rotation direction detection circuit 48 outputs signal $S_{49}$ of rotation direction, in a manner that the signal is "H" when the rotor magnet 39 rotates in a clockwise direction and "L" when the rotor magnet 39 rotates in an anticlock direction.

The signal $S_{45}$ from the wave-forming circuit 44 and the rotation direction detection signal $S_{49}$ from the rotation direction detection circuit 48 are given to the reset time setting circuit 50. The reset time setting circuit 50 also receives reset time setting signals $S_{51}$ from outside circuit and the reset time setting signal $S_{51}$ makes the rotation position signal $S_{45}$ delayed by a small time period for a predetermined number of pitch of pulses of the rotation fine position signal $S_{43}$ and the delayed rotation position signal $S_{52}$ is given to the fine position signal counter 53 as reset signal.

The compensation circuit 18″ of the embodiment, which is the same as that in FIG. 6, comprises the rotation fine position signal counter 53 for counting pulses of rotation fine position signal $S_{43}$ from the wave-forming circuit 27 for a time period defined by two rise-ups of the pulses of rotation position signal $S_{52}$ from the reset time setting circuit 50, a memory 54 for storing compensation data for respective rotation fine position signal $S_6$ in the partitioned time period between the two rise-ups of the pulses of the rotation position signal $S_{52}$, and a gain control circuit 55 for making gain control of a motor control signal $S_{56}$ by amplifying or attenuating it responding to compensation signal from the memory 54.

The counter 53 is constituted to be reset by the rise-ups of the pulses of the rotation position signal $S_{52}$ and counts the pulses of the rotation fine position signal $S_{43}$ from the wave-forming circuit 42, thereby producing count corresponding to rotation fine position of the rotor magnet 39.

The memory 54 is usually a read only memory (ROM), and stores compensation data for use in compensating the undesirable torque ripple to obtain uniform torque of the electronic commutator motor, and issues compensation data output responding to input signal as address signal of the counter 53.

Figure 15:
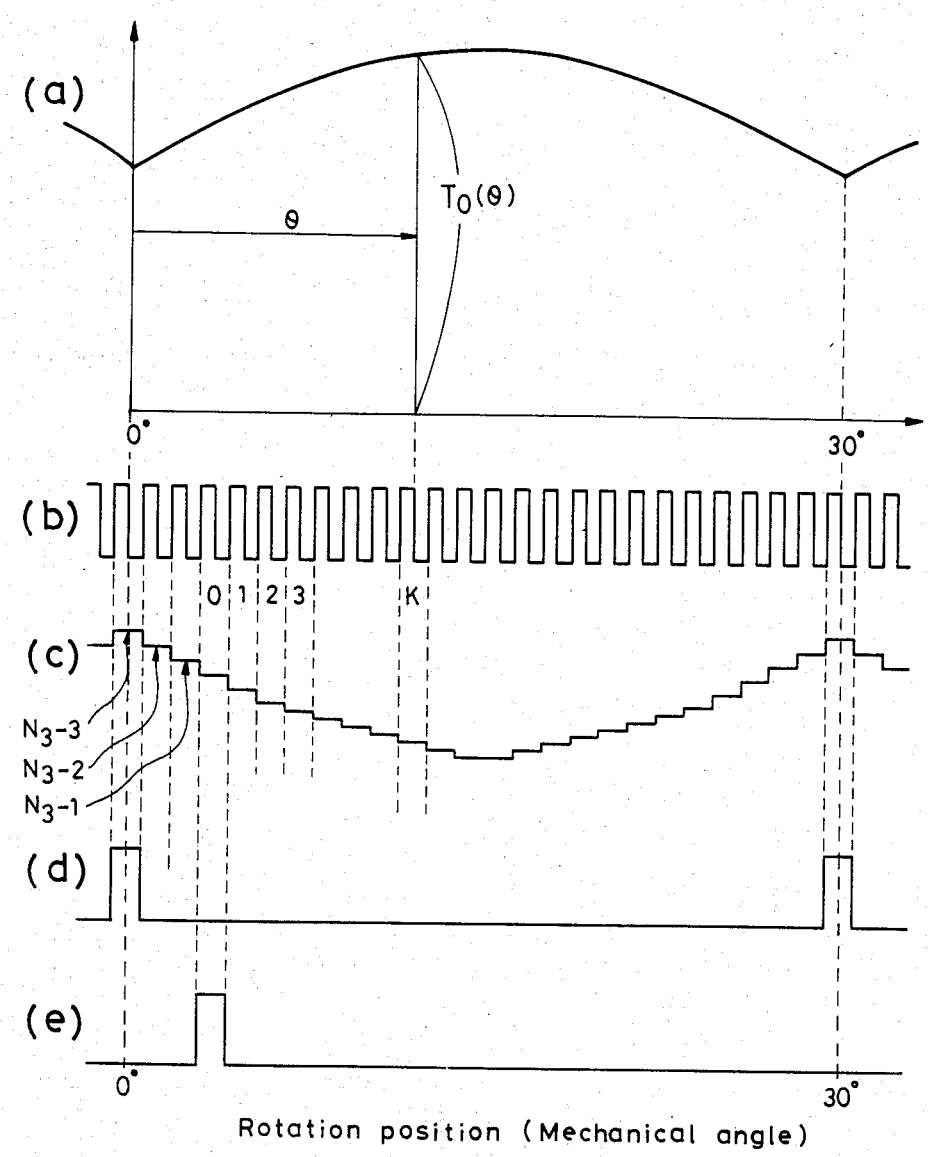
FIG. 15, FIG. 16, FIG. 17, FIG. 18 and FIG. 19 are time charts showing the operations of the embodiments in accordance with the present invention.

FIG. 15 shows operation of this embodiment.

FIG. 15 shows waveforms related to the compensation signal $S_7$. As has been described with reference to FIG. 5, switching of the current of stator coil are made at 0°, 30°, 60°, 90°, 120°, 150°, 180°, 210°, 240°, 270°, 300°, 330°, and 360°, and within each partition angle range for 30°, magnetic flux distribution changes in the same pattern as shown in curve (a) of FIG. 15. In other words, since the torque before compensation of torque ripple as shown in FIG. 5 repetition of twelve convex waveforms of the same pattern, it is sufficient with that the memory 54 stores compensation data for each partitioned angle range of 30° only, and the same compensation data are used for every convex waveforms of torque. Thus, the way of compensation for a 0°–30° partition angle-range only is described below, and the same applies for other partition angle ranges.

FIG. 15, (a) shows a curve of torque fluctuation for rotation fine angle of 0°–30° range. FIG. 15, (b) shows pulses of rotation fine position signal $S_{43}$. FIG. 15, (c) shows data in the memory 54 for torque ripple compensation represented in analogue way.

Curve (d) of FIG. 15 shows rotation position signal $S_{45}$ of the case when positional relation between the rotary encoder disc $R_3$ and the rotor magnet 39 is in a good agreement. Curve (e) of FIG. 15 shows delayed rotation position signal $S_{52}$ from the reset time setting circuit 50. Now provided that, one pulse of the pulse train of the rotation fine position signal $S_{43}$ is defined as a clock pulse, the delayed rotation position signal $S_{52}$ is delayed by a time period of three clocks by the reset time setting circuit 50 for adjustment. And though having minute steps, the curve (c) has a shape which is inversely proportional to the curve (a). The reason why the adjusted rotation position signal $S_{52}$ is delayed by three clock period from that of the signal $S_{45}$ is that compensation of time lag of the output signal $S_{45}$ could be compensated of the disagreement within the pitches of ±3 clock pulses.

Torque $T_0(\theta)$, which is the torque of the electronic commutator motor when the rotation position in mechanical angle is $\theta$° as shown in (a) of FIG. 15, is represented by the following equation:

$$T_0(\theta) = K_5 \cdot B(\theta) \cdot I_M \cdot l \quad (13),$$

wherein
$0° \leq \theta \leq 30°$ and
$K_5$ is a constant.

As shown in equation (13), the magnetic flux density $B(\theta)$ changes corresponding to change of rotation position $\theta°$.

Accordingly, when a compensation function $D_C(\theta)$ is defined by the following equation (12):

$$D_c(\theta) = K_6 \cdot \frac{1}{B(\theta)}, \quad (12)$$

wherein $K_6$ is a constant.

Then, by utilizing this function and motor control signal $S_{56}$ which is for the motor to rotate at stable speed, the stator coil current $I_M$ is compensatedly controlled in the gain control circuit 55, and the following compensated current $I_M(\theta)$ for the rotation position angle $\theta°$ is obtainable:

$$I_M(\theta) = D_C(\theta) \cdot Ia \quad (15)$$
$$= K_6 \cdot Ia \cdot \frac{1}{B(\theta)},$$

wherein
$K_6$ is a constant.

Accordingly, the torque value $T_C(\theta)$ after compensation is given as follows:

$$T_C(\theta) = K_5 \cdot B(\theta) \cdot I_M(\theta) \cdot l \quad (16)$$
$$= K_5 \cdot B(\theta) \cdot K_6 \cdot Ia \cdot \frac{1}{B(\theta)} \cdot l$$
$$= K_5 \cdot K_6 \cdot Ia \cdot l.$$

As is shown in the equation (16), the $T_C(\theta)$ becomes independent from the rotary fine position $\theta$. That is, the compensated torque becomes uniform irrespective of the rotation position.

Since the ROM is used as the memory 54, the actual torque compensation data $D_{RC}(K)$ to be stored in the ROM in digital data become discrete data as shown in FIG. 15(c). The torque compensation data $D_{RC}(K)$ are stored in addresses of from 0 to $(N_3-1)$, and upon reception of a rise-up of pulse of rotation position signal $S_{52}$, the rotation fine position signal counter 53 is reset to the output of count 0, and therefore the address to be accessed in the ROM 54 is reset to address 0. And as pulses of the rotation fine position signal $S_{43}$ come in sequence, the address advance to 1, 2, 3, ... in sequence, thereby outputting compensation data $S_7$ to the gain control circuit 55 as the torque compensation signal $S_7$.

Hereupon the compensation data $D_{RC}(K)$ stored in the address K of the ROM is represented as follows:

$$D_{RC}(K) = K_6 \cdot \frac{1}{B(\theta)}, \quad (17)$$

$$\theta_K = 30° \times \frac{(K+3)}{N_3}. \quad (18)$$

The above-mentioned operation case is the case that a rotary encoder disc $R_3$ and the rotor magnet 39 are in good positional agreement each other. However, in manufacturing the electronic commutator motor, it is not necessarily possible to construct the rotor magnet 39 and the rotary encoder disc $R_3$ in accurate agreement in designed position. Therefore, the present embodiment can adjust rotating position disagreement between the rotor magnet 39 and the rotary encoder disc $R_3$ by the extent of fine position angles for three slits which corresponds to $\pm 3$ clock pulses. Firstly, FIG. 16 shows a case that the rotation position signal $S_{45}$ from the wave-forming circuit 44 advances by three clock pitches from the accurate agreement position.

Figure 16:
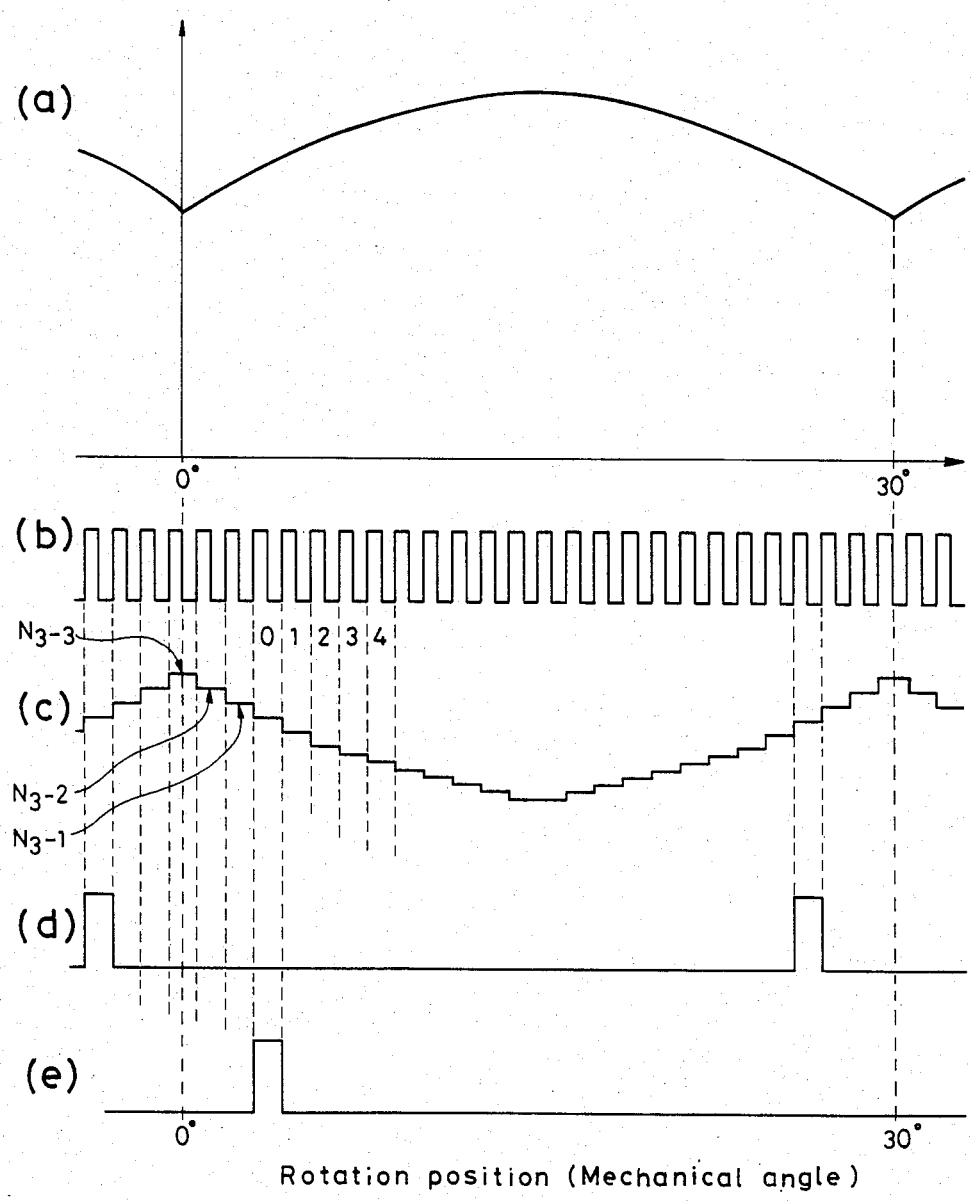

FIG. 16, curve (a) shows a curve of torque fluctuation for rotation fine angle of 20°–30° range like the curve of FIG. 15(a). FIG. 16, curve (b) shows pulses of rotation fine position signal $S_{43}$ from the wave-forming circuit 42. FIG. 16, curve (c) shows data in the memory 54 for torque ripple compensation represented in analogue way.

Curve (d) of FIG. 16 shows rotation position signal $S_{45}$ and this signal is leading by three clock pitches from the case of signal (d) of FIG. 15. In this case, by utilizing the reset time setting circuit 50, the timing is delayed by six clock pitches, thereby to obtain a signal shown by a curve (e) of FIG. 16, which shows delayed rotation position signal $S_{52}$ from the reset time setting circuit 50. In such way, a torque ripple compensation signal of a pattern of (c) of FIG. 16 is obtainable with adjusted timing. Thus, the compensation signal $S_7$ has the right rotation position like the curve (c) of FIG. 15.

Figure 17:
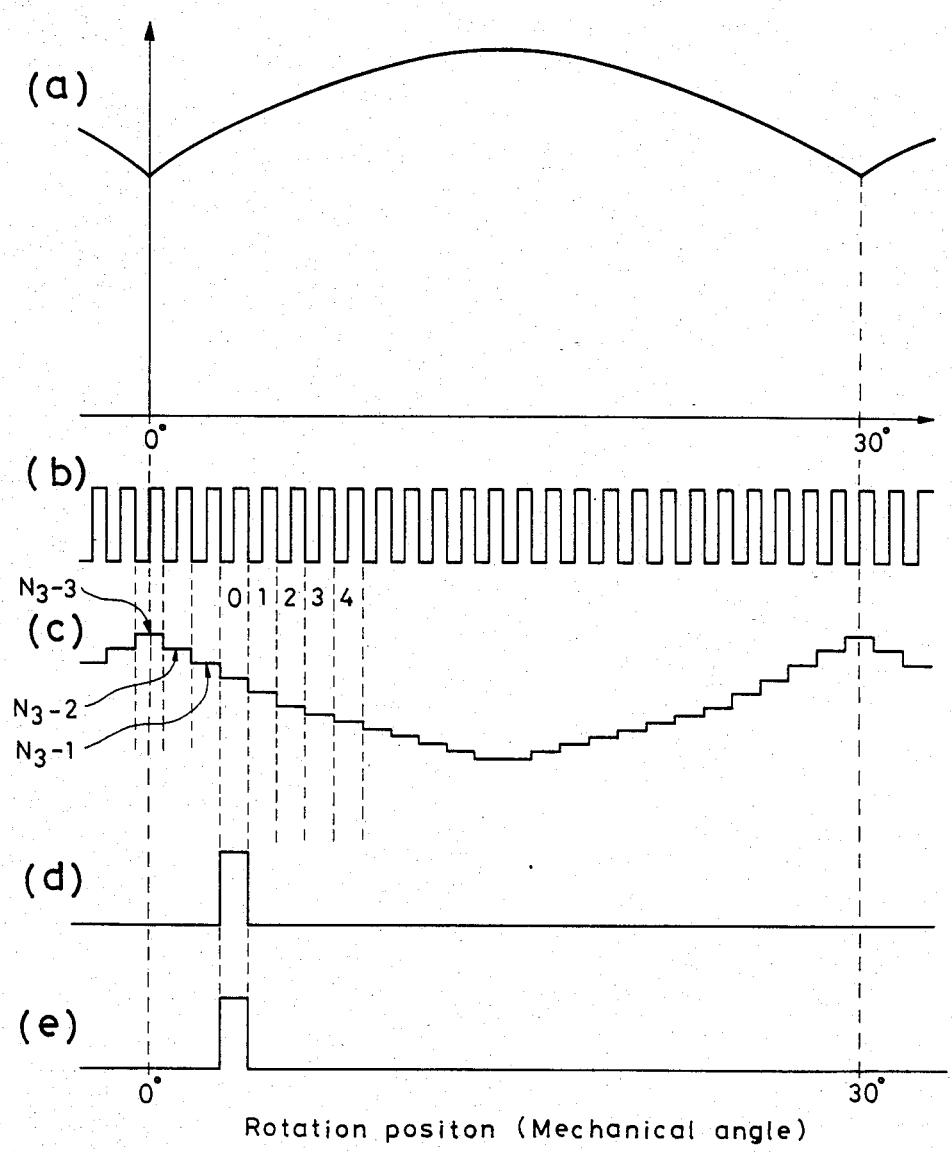

Nextly the case of operation when the rotation direction of the rotor megnet 39 is inverse to the case of FIG. 16 is shown in FIG. 17. In FIG. 17, curve (a) shows a curve of torque fluctuation like the curve (a) of FIG. 16; curve (b) of FIG. 17 shows pulses of rotation fine position signal $S_{43}$; curve (c) of FIG. 17 shows data in the memory 54 for torque ripple compensation represented in analog way; curve (d) of FIG. 17 shows rotation position signal $S_{45}$ which lags by three clock pitches from the corresponding case of (d) of FIG. 15. Accordingly, by selecting the operation of the reset time setting circuit 50 to keep reset time setting signal $S_{51}$ similar to the case of the rotation direction shown in FIG. 16, and by use of changingthe level of output signal $S_{49}$ of the rotation direction detection circuit 48 in a predetermined way, delay value is switched as desired, and the rotation position signal $S_{52}$ of FIG. 17 adjusted in a right rotation position is obtainable as shown by curve (e) of FIG. 17 by the adjustment. By such signal processing, the obtained signal $S_{52}$ has the same timing as that of the curve (e) of FIG. 15. Accordingly, a compensated torque pattern as shown by curve (c) of FIG. 17 is obtainable.

Figure 18:
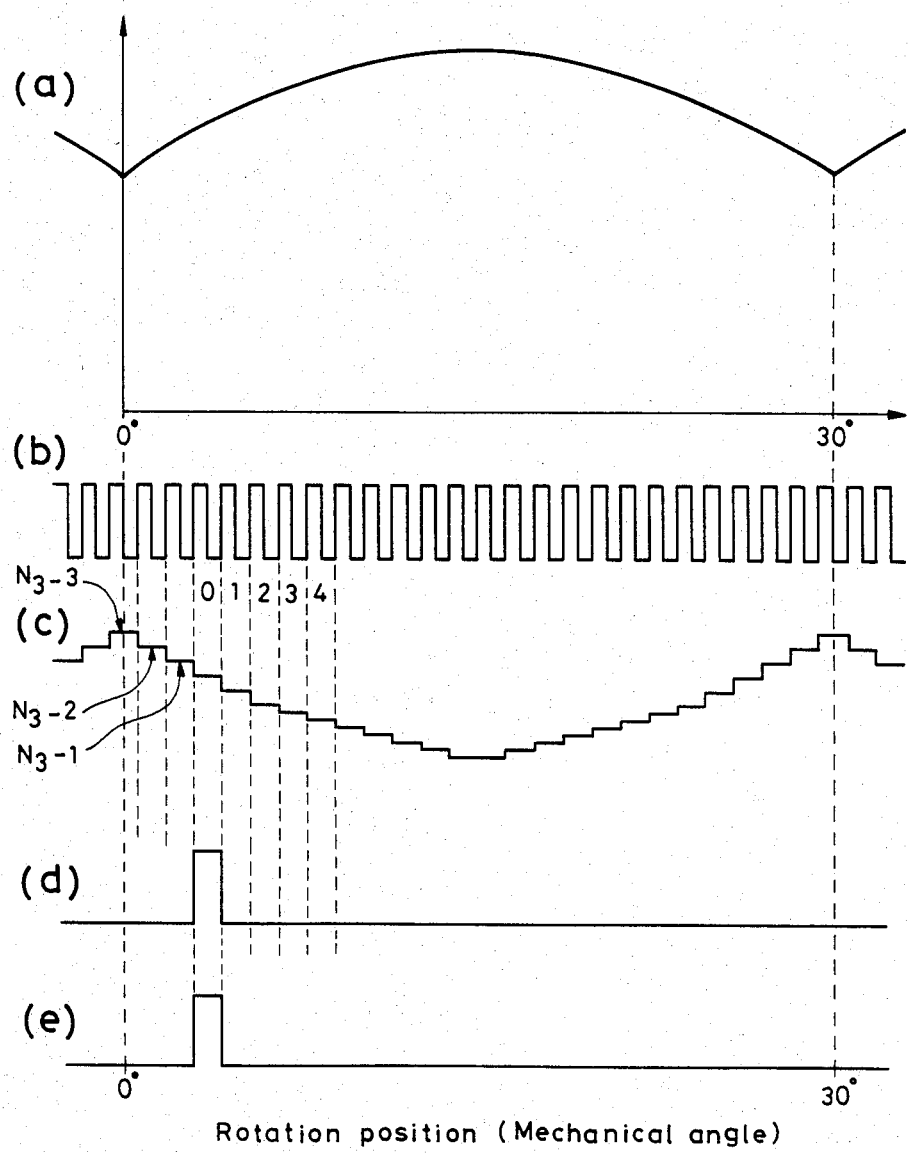

FIG. 18 shows such a case of operation as the rotation position signal $S_{45}$ from the wave-forming circuit 42 is lagging by three clock pitches from a right one, contrarily to the case of FIG. 16. Curve (a) of FIG. 18 shows a curve of torque fluctuation for one of the twelve-partitioned range of one rotation of the rotor magnet 39 like the curve (a) of FIG. 16. Curve (b) of FIG. 18 shows pulses of rotation fine position signal $S_{43}$. Curve (d) of FIG. 18 shows rotation position signal $S_{45}$ which is lagging by three clock pitches from that of the curve (d) of FIG. 15. Accordingly, by selecting the operation of the reset time setting circuit 50 so as to make the delay value zero, a compensated rotation position signal $S_{52}$ of curve (e) of FIG. 18 is obtained. Therefore, a torque compensation signal $S_7$ shown by curve (c) of FIG. 18 is obtained and a satisfactory torque ripple compensation is achieved.

Figure 19:
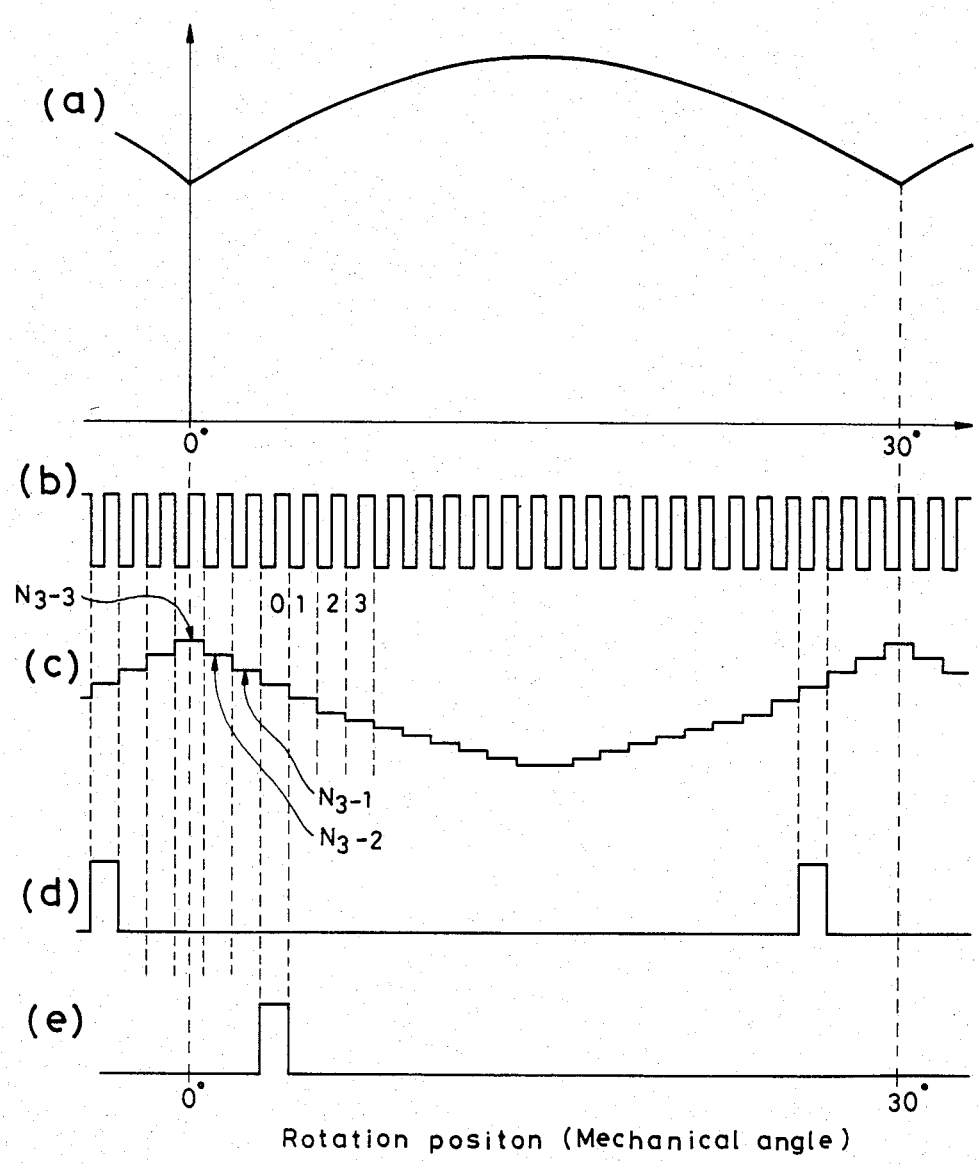

FIG. 19 shows such a case of operation as rotation direction of the rotor magnet 39 is inverse to the case of FIG. 18. In FIG. 19, curve (a) shows a curve of torque fluctuation for one of the twelve partitioned range of one rotation of the rotor magnet 39 like the curve (a) of FIG. 17. Curve (b) of FIG. 19 shows pulses of rotation fine position signal $S_{43}$. Curve (d) of FIG. 19 shows rotation position signal $S_{45}$, which is leading by three clock pitches to the case of the curve (d) of FIG. 15. Accordingly, by selecting the operation of the reset time setting circuit 50 to keep reset time setting signal $S_{51}$ similar to the case of the rotation direction shown in FIG. 18, and by use of changing the level of output signal $S_{49}$ of the rotation direction detection circuit 48 in a predetermined way, delay value is switched as desired, and thereby, the compensated rotation position signal $S_{52}$ of curve (e) of FIG. 18 is produced. Thus, the compensated rotation position signal $S_{52}$ shown by FIG. 19 (e) has the same timing as that shown by curve (e) of FIG. 15, and a torque ripple compensation signal $S_7$ shown by curve (c) of FIG. 19 is obtained and satisfactory torque ripple compensation is achieved.

Figure 20:
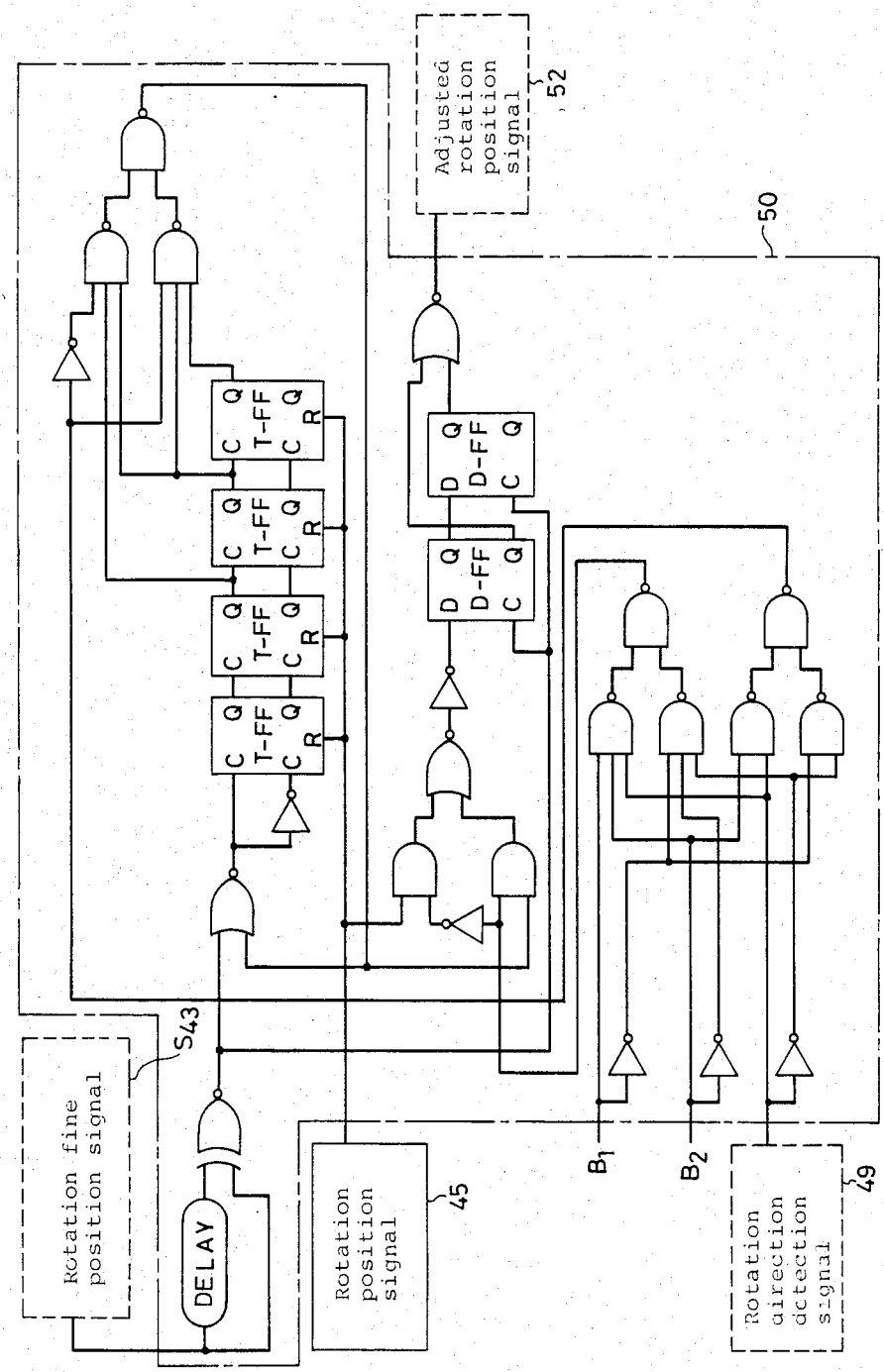
FIG. 20 is a circuit diagram of one example of a reset timing circuit in the circuit of FIG. 14.

FIG. 20 shows one example of a reset time setting circuit 50 to be used in the embodiment illustrated in FIG. 15–FIG. 19. The circuit configuration and component circuits are self-evident from their known signs. The delay value obtainable by the reset time setting circuit 50 of FIG. 20 is shown in the chart of FIG. 21. In FIG. 21, "H" and "L" designate high level and low level, respectively; "CW" and "CCW" designate clockwise and counterclockwise, respectively; and the numerals designate clock-pitches of delays.

Accordingly, by setting the signals $B_1$ and $B_2$ of the reset time setting circuit 51, so as to produce desired necessary compensation for angular disagreement between the rotor magnet 39 and the rotary encoder disc $R_3$, a satisfactory compensation of the angular position is obtainable irrespective of directions of rotation of the rotor magnet 39.

Instead of the above-mentioned uses of the Hall elements $H_7$, $H_8$ to make the rotation position signal, such other modified configuration may be used as providing a third circular row of slits with an additional LED and photoelectric element.

As still another modification, output signals for the motor drive circuit 25 from the Hall elements $H_7$, $H_8$ may be used to produce the rotation position signal $S_{45}$, instead of the use of the output signal from the photoelectric elements D5 and P5.

What is claimed is:

1. Rotation control apparatus for an electronic commutator motor, said electronic commutator motor comprising a predetermined plural number of stator coils disposed with a predetermined mechanical angle around an axis of rotation of said electronic commutator motor, a rotor magnet which has a predetermined number of magnetic poles of N and S disposed alternately with predetermined mechanical angles and held in a rotatable manner around said axis, and a rotation position signal output means for issuing a rotation position signal responding to mechanical rotation of said rotor magnet relative to said stator coils, wherein said rotation control apparatus comprises:

a rotation fine position signal output means for issuing a rotation fine position signal consisting of a predetermined number of pulses during one period of repetition of said rotation position signal in a synchronized relation with the rotation position signal, a rotation fine position signal counter for producing an electric angle signal which is a signal responding to number of pulses of said rotation fine position signal counted from each time when a pulse of said rotation position signal is issued by receiving said rotation fine position signal, memory means which has preliminarily stored data of compensation function for compensating amount of stator current to compensate torque ripple, to produce uniform torque, and produces a data responding to said electric angle signal, gain control means for controlling intensities of said stator coils responding to said output of said memory means, to produce compensated uniform current in said stator coils.

2. A rotation control apparatus for an electronic commutator motor in accordance with claim 1, wherein said rotation position signal is based on signal to control selective feeding of stator current.

3. A rotation control apparatus for an electronic commutator motor in accordance with claim 1, wherein said rotation position signal is fed to said rotation fine position counter through a variable delay circuit.

4. A rotation control apparatus for an electronic commutator motor in accordance with claim 3, which further comprises a rotation direction detection circuit, which controls delay value of said variable delay circuit by rotation direction detection signal thereof.

* * * * *